(12) United States Patent
Zhang et al.

(10) Patent No.: US 12,228,796 B2
(45) Date of Patent: Feb. 18, 2025

(54) OPTICAL IMAGING SYSTEM

(71) Applicant: ZHEJIANG SUNNY OPTICS CO., LTD., Zhejiang (CN)

(72) Inventors: Jiaying Zhang, Zhejiang (CN); Saifeng Lyu, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 492 days.

(21) Appl. No.: 17/669,433

(22) Filed: Feb. 11, 2022

(65) Prior Publication Data

US 2022/0269045 A1 Aug. 25, 2022

(30) Foreign Application Priority Data

Feb. 22, 2021 (CN) .......................... 202110196195.1

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC ........ G02B 9/64; G02B 13/0045; G02B 3/02; G02B 9/00; G02B 13/001; G02B 13/0015; G02B 13/002; G02B 13/008; G02B 13/14; G02B 13/18
USPC ....... 359/356, 355, 357, 350, 642, 708, 738, 359/739, 754, 755
See application file for complete search history.

(56) References Cited

U.S. PATENT DOCUMENTS

2016/0033742 A1 2/2016 Huang
2020/0393652 A1* 12/2020 Kuo .......................... G02B 9/64

FOREIGN PATENT DOCUMENTS

| CN | 107577034 A | 1/2018 |
|---|---|---|
| CN | 108873256 A | 11/2018 |
| CN | 109085693 A | 12/2018 |
| CN | 110471164 A | 11/2019 |
| CN | 110596869 A | 12/2019 |
| CN | 210015279 U | 2/2020 |
| JP | 2015072403 A | 4/2015 |

OTHER PUBLICATIONS

Corresponding priority CN application first search result issued on Jul. 27, 2022.

(Continued)

*Primary Examiner* — Arnel C Lavarias
(74) *Attorney, Agent, or Firm* — Samson G. Yu

(57) ABSTRACT

The disclosure provides an optical imaging system, which sequentially includes, from an object side to an image side along an optical axis: a diaphragm; a first lens with a refractive power, an image-side surface thereof being a convex surface; a second lens with a refractive power; a third lens with a negative refractive power; a fourth lens with a refractive power, an image-side surface thereof being a convex surface; a fifth lens with a refractive power, an object-side surface thereof being a concave surface; a sixth lens with a refractive power; and a seventh lens with a refractive power. EPD is an entrance pupil diameter of the optical imaging system, and a total effective focal length f of the optical imaging system and EPD satisfy f/EPD≤1.5.

18 Claims, 13 Drawing Sheets

(56) References Cited

OTHER PUBLICATIONS

Corresponding priority CN application second search result issued on Sep. 9, 2022.
Corresponding priority IN application search result issued on Sep. 13, 2022.

* cited by examiner

OPTICAL IMAGING SYSTEM

CROSS-REFERENCE TO RELATED APPLICATION(S)

The disclosure claims priority to and the benefit of Chinese Patent Application No. 202110196195.1, filed in the China National Intellectual Property Administration (CNIPA) on 22 Feb. 2021, which is incorporated herein by reference in its entirety.

TECHNICAL FIELD

The disclosure relates to the field of optical elements, and more particularly to an optical imaging system.

BACKGROUND

In recent years, various portable electronic products such as smart phones have developed rapidly, and higher requirements have been made to optical imaging systems in portable electronic products.

In order to adapt to the rapid upgrading of portable electronic products, optical imaging systems are upgraded more and more rapidly, particularly in imaging quality thereof. However, conventional optical imaging systems often do not meet constantly updated design requirements of electronic products with the optical imaging systems, and need to be structurally improved and optimized. How to achieve the characteristics of large aperture and high imaging quality of an optical imaging system on the premise of ensuring the structural processibility is one of problems urgent to be solved in this art.

SUMMARY

The disclosure provides an optical imaging system, which sequentially includes, from an object side to an image side along an optical axis: a diaphragm; a first lens with a refractive power, an image-side surface thereof being a convex surface; a second lens with a refractive power; a third lens with a negative refractive power; a fourth lens with a refractive power, an image-side surface thereof being a convex surface; a fifth lens with a refractive power, an object-side surface thereof being a concave surface; a sixth lens with a refractive power; and a seventh lens with a refractive power. EPD is an entrance pupil diameter of the optical imaging system, and a total effective focal length f of the optical imaging system and EPD satisfy: f/EPD≤1.5.

In an implementation mode, Semi-FOV is a half of a maximum field of view of the optical imaging system, and Semi-FOV may satisfy: 40°<Semi-FOV<45°.

In an implementation mode, an effective focal length f1 of the first lens and an effective focal length f2 of the second lens may satisfy: −3.0<f2/f1<−2.5.

In an implementation mode, an effective focal length f3 of the third lens and an effective focal length f4 of the fourth lens may satisfy: −3.0<f3/f4<−1.5.

In an implementation mode, a spacing distance T67 of the sixth lens and the seventh lens on the optical axis and a spacing distance T23 of the second lens and the third lens on the optical axis may satisfy: 1.0<T67/T23<1.5.

In an implementation mode, TTL is a distance from an object-side surface of the first lens to an imaging surface of the optical imaging system on the optical axis, and TTL and a center thickness CT4 of the fourth lens on the optical axis may satisfy: 5.5<TTL/CT4<6.5.

In an implementation mode, a curvature radius R9 of the object-side surface of the fifth lens and a curvature radius R11 of an object-side surface of the sixth lens satisfy: −3.0<R9/R11<−1.5.

In an implementation mode, a curvature radius R8 of the image-side surface of the fourth lens and a curvature radius R4 of an image-side surface of the second lens may satisfy: −2.5<R8/R4<−1.5.

In an implementation mode, a curvature radius R12 of an image-side surface of the sixth lens, a curvature radius R13 of an object-side surface of the seventh lens and a curvature radius R14 of an image-side surface of the seventh lens may satisfy: 3.0<(R12+R13)/R14<4.5.

In an implementation mode, a spacing distance T34 of the third lens and the fourth lens on the optical axis and a spacing distance T56 of the fifth lens and the sixth lens on the optical axis may satisfy: 1.0≤T34/T56≤2.5.

In an implementation mode, a center thickness CT5 of the fifth lens on the optical axis and a spacing distance T45 between the fourth lens and the fifth lens on the optical axis may satisfy: 3.0<CT5/T45<6.1.

In an implementation mode, a combined focal length f34 of the third lens and the fourth lens and a combined focal length f12 of the first lens and the second lens may satisfy: 1.0<f34/f12<2.0.

In an implementation mode, SAG22 is an on-axis distance from an intersection point of an image-side surface of the second lens and the optical axis to an effective radius vertex of the image-side surface of the second lens, SAG21 is an on-axis distance from an intersection point of an object-side surface of the second lens and the optical axis to an effective radius vertex of the object-side surface of the second lens, and SAG22 and SAG21 satisfy: 0.5<SAG22/SAG21<1.5.

In an implementation mode, an Abbe number V2 of the second lens and an Abbe number V3 of the third lens may satisfy: V2+V3<40.

In an implementation mode, an Abbe number V5 of the fifth lens may satisfy: V5<40.

The disclosure also provides an optical imaging system, which sequentially includes, from an object side to an image side along an optical axis: a diaphragm; a first lens with a refractive power, an image-side surface thereof being a convex surface; a second lens with a refractive power; a third lens with a negative refractive power; a fourth lens with a refractive power, an image-side surface thereof being a convex surface; a fifth lens with a refractive power, an object-side surface thereof being a concave surface; a sixth lens with a refractive power; and a seventh lens with a refractive power. Semi-FOV is a half of a maximum field of view of the optical imaging system, and Semi-FOV satisfies: 40°<Semi-FOV<45°.

In an implementation mode, an effective focal length f1 of the first lens and an effective focal length f2 of the second lens may satisfy: −3.0<f2/f1<−2.5.

In an implementation mode, an effective focal length f3 of the third lens and an effective focal length f4 of the fourth lens may satisfy: −3.0<f3/f4<−1.5.

In an implementation mode, a spacing distance T67 of the sixth lens and the seventh lens on the optical axis and a spacing distance T23 of the second lens and the third lens on the optical axis may satisfy: 1.0<T67/T23<1.5.

In an implementation mode, TTL is a distance from an object-side surface of the first lens to an imaging surface of the optical imaging system on the optical axis, and TTL and a center thickness CT4 of the fourth lens on the optical axis may satisfy: 5.5<TTL/CT4<6.5.

In an implementation mode, a curvature radius R9 of the object-side surface of the fifth lens and a curvature radius R11 of an object-side surface of the sixth lens may satisfy: $-3.0<R9/R11<-1.5$.

In an implementation mode, a curvature radius R8 of the image-side surface of the fourth lens and a curvature radius R4 of an image-side surface of the second lens may satisfy: $-2.5<R8/R4<-1.5$.

In an implementation mode, a curvature radius R12 of an image-side surface of the sixth lens, a curvature radius R13 of an object-side surface of the seventh lens and a curvature radius R14 of an image-side surface of the seventh lens may satisfy: $3.0<(R12+R13)/R14<4.5$.

In an implementation mode, a spacing distance T34 of the third lens and the fourth lens on the optical axis and a spacing distance T56 of the fifth lens and the sixth lens on the optical axis may satisfy: $1.0 \leq T34/T56 \leq 2.5$.

In an implementation mode, a center thickness CT5 of the fifth lens on the optical axis and a spacing distance T45 between the fourth lens and the fifth lens on the optical axis may satisfy: $3.0<CT5/T45<6.1$.

In an implementation mode, a combined focal length f34 of the third lens and the fourth lens and a combined focal length f12 of the first lens and the second lens may satisfy: $1.0<f34/f12<2.0$.

In an implementation mode, SAG22 is an on-axis distance from an intersection point of an image-side surface of the second lens and the optical axis to an effective radius vertex of the image-side surface of the second lens, SAG21 is an on-axis distance from an intersection point of an object-side surface of the second lens and the optical axis to an effective radius vertex of the object-side surface of the second lens, and SAG22 and SAG21 may satisfy: $0.5<SAG22/SAG21<1.5$.

In an implementation mode, an Abbe number V2 of the second lens and an Abbe number V3 of the third lens may satisfy: $V2+V3<40$.

In an implementation mode, an Abbe number V5 of the fifth lens may satisfy: $V5<40$.

According to the disclosure, a seven-lens structure is used, and the refractive power and surface types of each lens, the center thickness of each lens, on-axis distances between the lenses and the like are reasonably configured to achieve at least one of beneficial effects of high imaging quality, large aperture and the like of the optical imaging system.

BRIEF DESCRIPTION OF THE DRAWINGS

Detailed descriptions are made to the following nonrestrictive implementation modes below in combination with the drawings to make the other features, objectives and advantages of the disclosure more apparent. In the drawings.

DETAILED DESCRIPTION OF THE EMBODIMENTS

Figure 1:
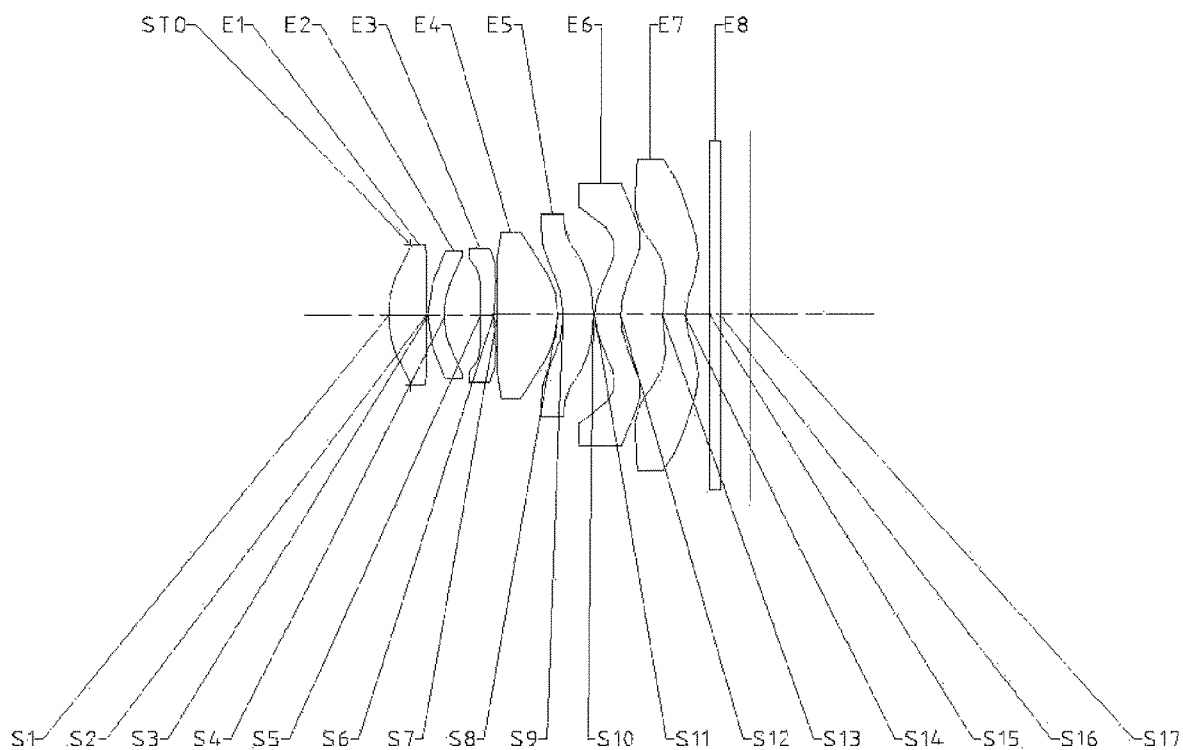
FIG. 1 shows a structure diagram of an optical imaging system according to Embodiment 1 of the disclosure.

In order to understand the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, expressions first, second, third and the like are only used to distinguish one feature from another feature and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated feature, component and/or part but do not exclude existence or addition of one or more other features, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings as commonly understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging system according to an exemplary implementation mode of the disclosure may include, for example, seven lenses with refractive power, i.e., a first lens, a second lens, a third lens, a fourth lens, a fifth lens, a sixth lens, and a seventh lens. The seven lenses are sequentially arranged from an object side to an image side along an optical axis. In the first lens to the seventh lens, there may be an air space between any two adjacent lenses.

In the exemplary implementation mode, the optical imaging system may further include at least one diaphragm. The diaphragm may be arranged at a proper position as required, for example, arranged between the object side and the first lens.

In the exemplary implementation mode, the first lens may have a positive refractive power or a negative refractive power; the second lens may have a positive refractive power or a negative refractive power; the third lens may have a negative refractive power; the fourth lens may have a positive refractive power or a negative refractive power; the fifth lens may have a positive refractive power or a negative refractive power; the sixth lens may have a positive refractive power or a negative refractive power; and the seventh lens may have a positive refractive power or a negative refractive power. The positive and negative refractive power of each lens of the optical imaging system is configured reasonably, so that the imaging quality of the optical imaging system may be improved effectively. In addition, the third lens has a negative refractive power, so that a field of view of the optical imaging system may be enlarged, and meanwhile, light may be converged better to help to improve the imaging quality of the optical imaging system.

In the exemplary implementation mode, an image-side surface of the first lens may be a convex surface, an image-side surface of the fourth lens may be a convex surface, and an object-side surface of the fifth lens may be a concave surface. The surface types of each lens of the optical imaging system are configured reasonably, so that the imaging quality of the optical imaging system may be improved effectively. In addition, the image-side surface of the fourth lens is a convex surface, and the object-side surface of the fifth lens is a concave surface, so that light may be converged better, and meanwhile, a spherical aberration of the optical imaging system may be improved to prevent light in a marginal field of view from being diverged excessively. Therefore, the optical imaging system is endowed with a higher coma correction capability.

In the exemplary implementation mode, the optical imaging system may satisfy: f/EPD≤1.5, wherein f is a total effective focal length of the optical imaging system, and EPD is an entrance pupil diameter of the optical imaging system. The optical imaging system satisfies: f/EPD≤1.5, so that the optical imaging system is endowed with the characteristic of large aperture, which is favorable for improving an imaging effect in a dark field state.

In the exemplary implementation mode, the optical imaging system may satisfy: 40°<Semi-FOV<45°, wherein Semi-FOV is a half of a maximum field of view of the optical imaging system. The optical imaging system satisfies: 40°<Semi-FOV<45°, so that an imaging range of the optical imaging system may be controlled effectively. More specifically, Semi-FOV may satisfy: 40.5°<Semi-FOV<41.0°.

In the exemplary implementation mode, the optical imaging system may satisfy: −3.0<f2/f1<−2.5, wherein f1 is an effective focal length of the first lens, and f2 is an effective focal length of the second lens. The optical imaging system satisfies: −3.0<f2/f1<−2.5, so that the balancing of an off-axis aberration of the optical imaging system and the improvement of the imaging quality of the optical imaging system are facilitated. More specifically, f2 and f1 may satisfy: −2.90<f2/f1<−2.60.

In the exemplary implementation mode, the optical imaging system may satisfy: −3.0<f3/f4<−1.5, wherein f3 is an effective focal length of the third lens, and f4 is an effective focal length of the fourth lens. The optical imaging system satisfies: −3.0<f3/f4<−1.5, so that the canceling of positive and negative spherical aberrations generated by the third lens and the fourth lens is facilitated. More specifically, f3 and f4 may satisfy: −2.50<f3/f4<−1.70.

In the exemplary implementation mode, the optical imaging system may satisfy: 1.0<T67/T23<1.5, wherein T67 is a spacing distance of the sixth lens and the seventh lens on the optical axis, and T23 is a spacing distance of the second lens and the third lens on the optical axis. The optical imaging system satisfies: 1.0<T67/T23<1.5, so that a field curvature of the optical imaging system may be ensured effectively to further achieve high imaging quality in an off-axis field of view of the system. More specifically, T67 and T23 may satisfy: 1.10<T67/T23<1.25.

In the exemplary implementation mode, the optical imaging system may satisfy: 5.5<TTL/CT4<6.5, wherein TTL is a distance from the object-side surface of the first lens to an imaging surface of the optical imaging system on the optical axis, and CT4 is a center thickness of the fourth lens on the optical axis. The optical imaging system satisfies: 5.5<TTL/CT4<6.5, so that ghosts generated by the fourth lens may be avoided effectively, and the optical imaging system is endowed with a higher spherical aberration and distortion correction capability. More specifically, TTL and CT4 may satisfy: 5.70<TTL/CT4<6.10.

In the exemplary implementation mode, the optical imaging system may satisfy: −3.0<R9/R11<−1.5, wherein R9 is a curvature radius of the object-side surface of the fifth lens, and R11 is a curvature radius of an object-side surface of the sixth lens. The optical imaging system satisfies: −3.0<R9/R11<−1.5, so that light deflection angles of the fifth lens and the sixth lens may be reduced to help the optical imaging system to deflect a light path relatively well. More specifically, R9 and R11 may satisfy: −2.60<R9/R11<−1.75.

In the exemplary implementation mode, the optical imaging system may satisfy: −2.5<R8/R4<−1.5, wherein R8 is a curvature radius of the image-side surface of the fourth lens, and R4 is a curvature radius of an image-side surface of the second lens. The optical imaging system satisfies: −2.5<R8/R4<−1.5, so that a light angle in a marginal field of view may be controlled in a reasonable range to help to reduce the sensitivity of the optical imaging system. More specifically, R8 and R4 may satisfy: −2.15<R8/R4<−1.60.

In the exemplary implementation mode, the optical imaging system may satisfy: 3.0<(R12+R13)/R14<4.5, wherein R12 is a curvature radius of an image-side surface of the sixth lens, R13 is a curvature radius of an object-side surface of the seventh lens, and R14 is a curvature radius of the image-side surface of the seventh lens. The optical imaging system satisfies: 3.0<(R12+R13)/R14<4.5, so that the better correction of a chromatic aberration and the improvement of the imaging quality are facilitated, and meanwhile, the problem of tolerance sensitivity increase of the optical imaging system caused by concentration of the refractive power and the excessive bending of the surfaces may be solved. More specifically, R12, R13 and R14 may satisfy: 3.40<(R12+R13)/R14<4.50.

In the exemplary implementation mode, the optical imaging system may satisfy: 1.0≤T34/T56≤2.5, wherein T34 is a spacing distance of the third lens and the fourth lens on the optical axis, and T56 is a spacing distance of the fifth lens and the sixth lens on the optical axis. The optical imaging system satisfies: 1.0≤T34/T56≤2.5, so that a field curvature contribution of each field of view may be controlled effectively in a reasonable range.

In the exemplary implementation mode, the optical imaging system may satisfy: 3.0<CT5/T45<6.1, wherein CT5 is a center thickness of the fifth lens on the optical axis, and T45 is a spacing distance of the fourth lens and the fifth lens on the optical axis. The optical imaging system satisfies: 3.0<CT5/T45<6.1, so that ghosts generated between the fourth lens and the fifth lens may be avoided, and the optical imaging system is endowed with a higher spherical aberration and distortion correction capability. More specifically, CT5 and T45 may satisfy: 3.30<CT5/T45<6.10.

In the exemplary implementation mode, the optical imaging system may satisfy: 1.0<f34/f12<2.0, wherein f34 is a combined focal length of the third lens and the fourth lens, and f12 is a combined focal length of the first lens and the second lens. The optical imaging system satisfies: 1.0<f34/f12<2.0, wherein an aberration in a marginal field of view may be reduced, and meanwhile, the problem of tolerance sensitivity increase of the optical imaging system caused by the excessive concentration of the refractive power may be solved. More specifically, f34 and f12 may satisfy: 1.10<f34/f12<1.70.

In the exemplary implementation mode, the optical imaging system may satisfy: 0.5<SAG22/SAG21<1.5, wherein SAG22 is an on-axis distance from an intersection point of an image-side surface of the second lens and the optical axis to an effective radius vertex of the image-side surface of the second lens, and SAG21 is an on-axis distance from an intersection point of an object-side surface of the second lens and the optical axis to an effective radius vertex of the object-side surface of the second lens. The optical imaging system satisfies: 0.5<SAG22/SAG21<1.5, so that a deflection degree of light may be controlled to correct an aberration in a marginal field of view, and meanwhile, ghosts of the system may be improved well. More specifically, SAG22 and SAG21 may satisfy: 0.90<SAG22/SAG21<1.10.

In the exemplary implementation mode, the optical imaging system may satisfy: V2+V3<40, wherein V2 is an Abbe number of the second lens, and V3 is an Abbe number of the third lens. The optical imaging system satisfies: V2+V3<40, so that a chromatic aberration of the optical imaging system may be corrected effectively to achieve a clearer imaging effect and higher imaging quality of the system.

In the exemplary implementation mode, the optical imaging system may satisfy: V5<40, wherein V5 is an Abbe number of the fifth lens. The optical imaging system satisfies: V5<40, so that aberrations generated by the other lenses in the optical imaging system may be balanced effectively, and meanwhile, a deflection angle of marginal light may be reduced to avoid an assembling process of the system being affected by large segment gaps between the lenses due to an excessively large deflection angle.

In the exemplary implementation mode, the optical imaging system may further include an optical filter configured to correct a chromatic aberration and/or protective glass configured to protect a photosensitive element on the imaging surface.

The optical imaging system according to the implementation mode of the disclosure may adopt multiple lenses, for example, the above-mentioned seven. The refractive power and surface types of each lens, the center thickness of each lens, on-axis distances between the lenses and the like are reasonably configured to effectively reduce the size of the optical imaging system, reduce the sensitivity of the optical imaging system and improve the machinability of the optical imaging system, such that the optical imaging system is more favorable for production and machining and applicable to a portable electronic product. The optical imaging system according to the implementation mode of the disclosure also has the characteristic of large aperture.

In the implementation mode of the disclosure, at least one of mirror surfaces of each lens is an aspheric mirror surface, namely at least one of the object-side surface of the first lens to an image-side surface of the seventh lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens and the seventh lens is an aspheric mirror surface. Optionally, both the object-side surface and image-side surface of each lens in the first lens, the second lens, the third lens, the fourth lens, the fifth lens, the sixth lens and the seventh lens are aspheric mirror surfaces.

However, those skilled in the art should know that the number of the lenses forming the optical imaging system may be changed without departing from the technical solutions claimed in the disclosure to achieve each result and advantage described in the specification. For example, although descriptions are made in the implementation mode with seven lenses as an example, the optical imaging system is not limited to include seven lenses. If necessary, the optical imaging system may also include another number of lenses.

Specific embodiments applied to the optical imaging system of the above-mentioned implementation mode will further be described below with reference to the drawings.

Embodiment 1

An optical imaging system according to Embodiment 1 of the disclosure will be described below with reference to FIGS. 1-2D. FIG. 1 is a structure diagram of an optical imaging system according to Embodiment 1 of the disclosure.

As shown in FIG. 1, the optical imaging system sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a concave surface, while an image-side surface S8 is a convex surface. The fifth lens E5 has a negative refractive power, an object-side surface S9 thereof is a concave surface, while an image-side surface S10 is a convex surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging system has an imaging surface S17. Light from an object sequentially penetrates through each of the surfaces S1 to S16 and is finally imaged on the imaging surface S17.

Table 1 shows a table of basic parameters for the optical imaging system of Embodiment 1, and units of the curvature radius, the thickness and the focal length are all millimeter (mm).

In Embodiment 1, a total effective focal length f of the optical imaging system is 5.10 mm. TTL is a distance from the object-side surface S1 of the first lens E1 to the imaging surface S17 on the optical axis, and TTL is 7.27 mm. Semi-FOV is a half of a maximum field of view of the optical imaging system, and Semi-FOV is 40.8°. ImgH is a half of a diagonal length of an effective pixel region on the imaging surface S17, and ImgH is 4.52 mm.

In Embodiment 1, both the object-side surface and image-side surface of any lens in the first lens E1 to the seventh lens E7 are aspheric surfaces. A surface type x of each aspheric lens may be defined through, but not limited to, the following aspheric surface formula:

$$x = \frac{ch^2}{1 + \sqrt{1 - (k+1)c^2h^2}} + \Sigma Aih^i, \qquad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows high-order coefficients $A_4$, $A_6$, $A_8$, $A_{10}$, $A_{12}$, $A_{14}$, $A_{16}$, $A_{18}$ and $A_{20}$ that can be used for each of the aspheric mirror surfaces S1-S14 in Embodiment 1.

TABLE 1

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4415 | | | | |
| S1 | Aspheric | 3.3088 | 0.7604 | 1.55 | 55.9 | 5.95 | −0.0702 |
| S2 | Aspheric | −162.4699 | 0.0300 | | | | 99.0000 |
| S3 | Aspheric | 2.9062 | 0.3211 | 1.68 | 19.2 | −15.56 | −0.0562 |
| S4 | Aspheric | 2.1761 | 0.7367 | | | | 0.0271 |
| S5 | Aspheric | 13.1764 | 0.2700 | 1.68 | 19.2 | −16.90 | −64.6423 |
| S6 | Aspheric | 6.0722 | 0.0749 | | | | 0.3756 |
| S7 | Aspheric | −700.0000 | 1.2156 | 1.55 | 55.9 | 6.63 | −99.0000 |
| S8 | Aspheric | −3.6014 | 0.1026 | | | | −1.2771 |
| S9 | Aspheric | −3.6160 | 0.6000 | 1.57 | 37.4 | −16.36 | −0.1767 |
| S10 | Aspheric | −6.2618 | 0.0300 | | | | −0.2632 |
| S11 | Aspheric | 1.8512 | 0.5200 | 1.55 | 55.9 | 7.92 | −0.9149 |
| S12 | Aspheric | 2.9171 | 0.8413 | | | | −0.8505 |
| S13 | Aspheric | 2.5986 | 0.4550 | 1.54 | 55.7 | −7.43 | −1.0054 |
| S14 | Aspheric | 1.4769 | 0.4997 | | | | −1.1615 |
| S15 | Spherical | Infinite | 0.2100 | 1.56 | 51.3 | | |
| S16 | Spherical | Infinite | 0.6027 | | | | |
| S17 | Spherical | Infinite | | | | | |

TABLE 2

| Surface number | A4 | A6 | A8 | A10 | A12 |
|---|---|---|---|---|---|
| S1 | 6.9943E−03 | −6.9607E−03 | −2.6775E−03 | −8.4041E−04 | −1.8999E−04 |
| S2 | 1.3606E−02 | −1.0627E−02 | −2.7132E−03 | 4.9205E−04 | −3.3350E−04 |
| S3 | −1.1912E−01 | 1.3129E−02 | 1.0326E−03 | 2.8114E−03 | 4.4440E−04 |
| S4 | −1.5896E−01 | 5.2302E−04 | −2.0650E−03 | 2.8719E−04 | 2.3205E−05 |
| S5 | −2.2965E−01 | −1.4911E−02 | −5.0573E−04 | 2.3546E−04 | 2.7236E−05 |
| S6 | −3.1714E−01 | 5.4251E−03 | 4.1164E−03 | 1.6266E−03 | 3.0864E−04 |
| S7 | 3.0634E−02 | 2.2617E−02 | −3.3657E−03 | 2.7391E−03 | 3.9708E−04 |
| S8 | −3.2522E−01 | 1.5000E−01 | −4.4252E−02 | 1.1428E−02 | 4.6908E−04 |
| S9 | 2.0190E−01 | 1.3106E−01 | −5.4701E−02 | 1.2831E−02 | −6.0054E−03 |
| S10 | −2.8103E−01 | 2.2771E−01 | −2.5171E−02 | −1.0155E−02 | −9.6491E−03 |
| S11 | −2.1343E+00 | 1.9035E−03 | 5.3918E−02 | 1.0737E−02 | 2.7247E−03 |
| S12 | −1.8857E+00 | 9.7749E−02 | 1.1052E−01 | −7.7097E−02 | 2.4032E−02 |
| S13 | −3.8472E+00 | 1.3387E+00 | −5.2423E−01 | 1.4953E−01 | −1.5271E−02 |
| S14 | −5.2606E+00 | 1.3538E+00 | −4.5381E−01 | 1.5020E−01 | −5.0034E−02 |

| Surface number | A14 | A16 | A18 | A20 |
|---|---|---|---|---|
| S1 | −1.6817E−05 | 9.2427E−06 | 8.2702E−06 | −7.4461E−06 |
| S2 | 2.3799E−04 | −8.6194E−05 | 4.9502E−05 | −1.9789E−05 |
| S3 | 4.8467E−04 | 3.9332E−05 | 5.9291E−05 | −1.0261E−05 |
| S4 | 5.2842E−05 | 2.1365E−05 | 1.0251E−05 | 1.0518E−05 |
| S5 | −1.6665E−06 | 6.8954E−06 | 3.7322E−06 | 6.7546E−07 |
| S6 | −9.8283E−05 | −5.9099E−05 | −4.6574E−05 | 1.5345E−06 |
| S7 | −4.6926E−04 | −1.9596E−05 | 2.9027E−05 | 9.0831E−06 |
| S8 | 3.6089E−03 | −3.8156E−04 | −2.2064E−04 | −4.6373E−05 |
| S9 | 3.2336E−03 | −1.4915E−03 | 2.6451E−04 | −2.8295E−05 |
| S10 | 2.1549E−03 | 5.7900E−04 | 2.2121E−04 | −2.0552E−04 |
| S11 | −3.1797E−03 | −1.6771E−03 | −4.2214E−04 | −2.1988E−04 |
| S12 | −3.2724E−03 | 5.2626E−03 | −2.8409E−03 | 3.5527E−04 |
| S13 | −3.1945E−03 | 9.0058E−04 | 1.3529E−03 | −1.0023E−03 |
| S14 | 1.0610E−02 | −6.3308E−03 | 7.1973E−03 | −1.9562E−03 |

Figure 2A:
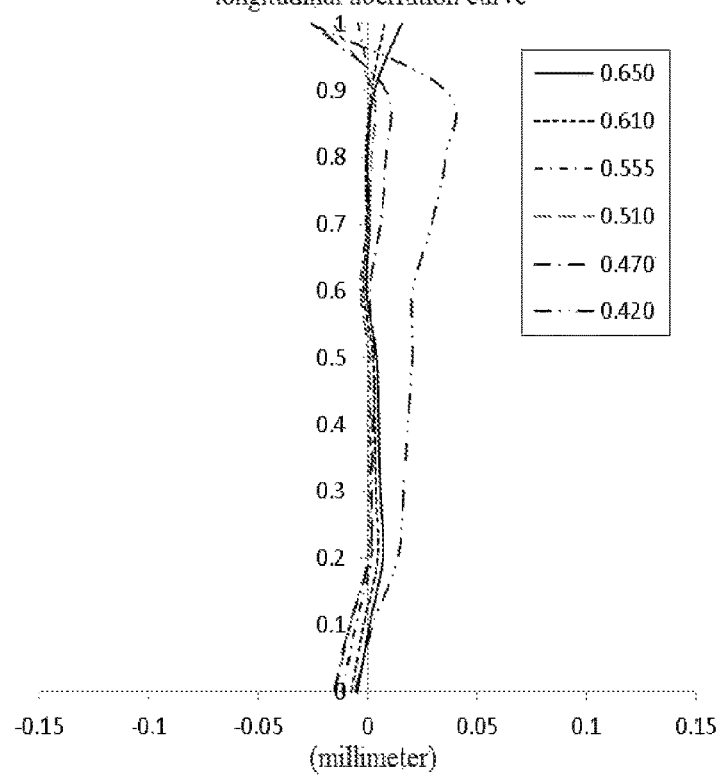
FIGS. 2A-2D show a longitudinal aberration curve, a astigmatism curve, a distortion curve and a lateral color curve of an optical imaging system according to Embodiment 1 respectively.
Figure 2B:
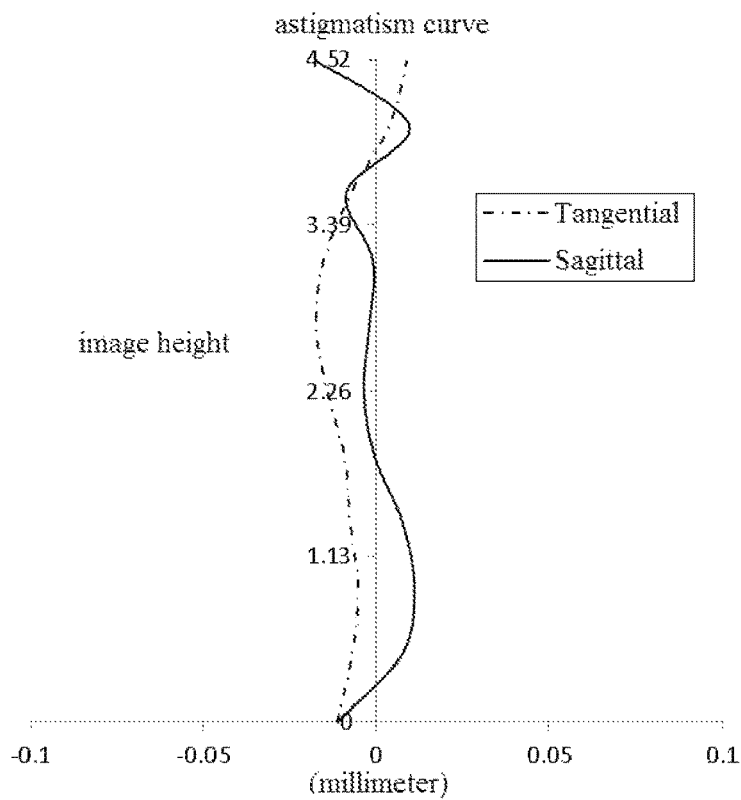
Figure 2C:
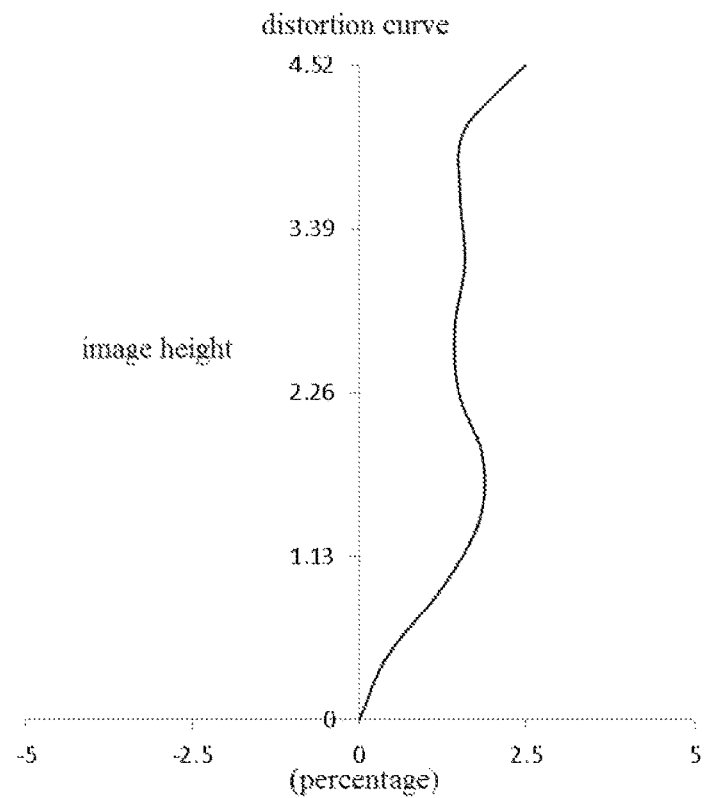
Figure 2D:
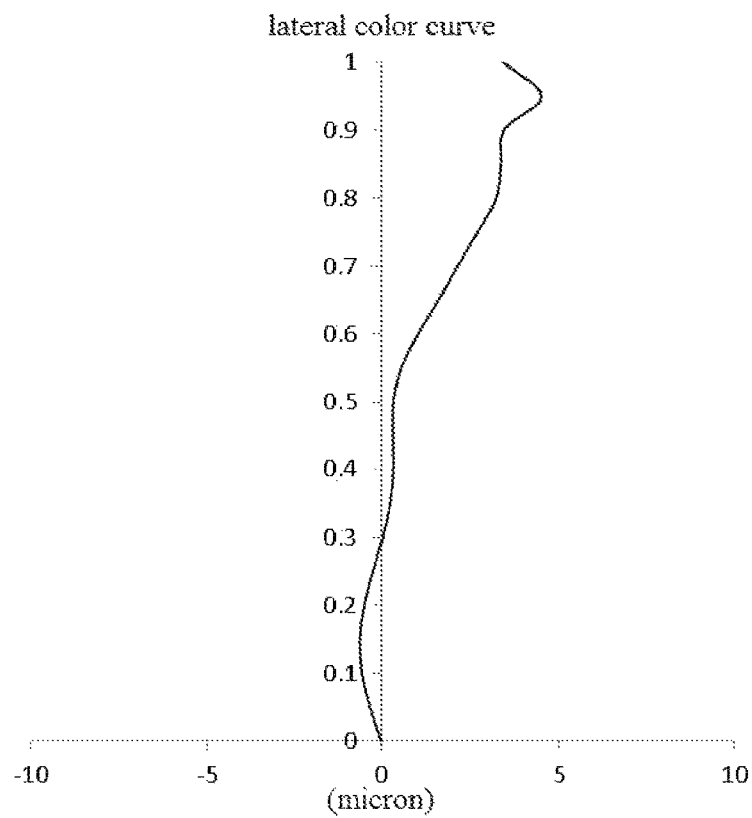

FIG. 2A shows a longitudinal aberration curve of the optical imaging system according to. Embodiment 1 to represent deviation of a convergence focal point after light with different wavelengths passes through the system. FIG. 2B shows an astigmatism curve of the optical imaging system according to Embodiment 1 to represent a tangential image surface curvature and a sagittal image surface curvature. FIG. 2C shows a distortion curve of the optical imaging system according to Embodiment 1 to represent distortion values corresponding to different image heights. FIG. 2D shows a lateral color curve of the optical imaging system according to Embodiment 1 to represent deviation of different image heights on the imaging surface after the light passes through the system. According to FIGS. 2A-2D, it can be seen that the optical imaging system provided in Embodiment 1 may achieve high imaging quality.

Embodiment 2

Figure 3:
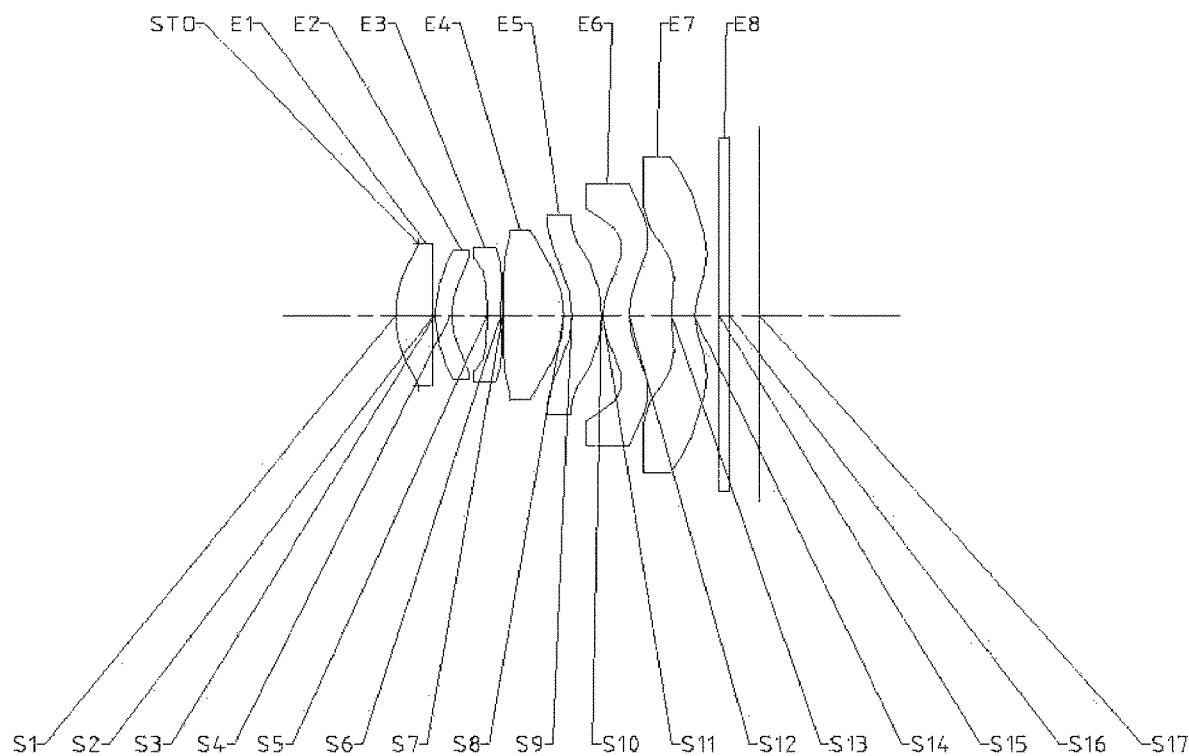
FIG. 3 shows a structure diagram of an optical imaging system according to Embodiment 2 of the disclosure.

An optical imaging system according to Embodiment 2 of the disclosure will be described below with reference to FIGS. 3-4D. In the embodiment and the following embodiments, part of descriptions similar to those about Embodiment 1 are omitted for simplicity. FIG. 3 is a structure diagram of an optical imaging system according to Embodiment 2 of the disclosure.

As shown in FIG. 3, the optical imaging system sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a negative refractive power, an object-side surface S5 thereof is a concave surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a convex surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging system has an imaging surface S17. Light from an object sequentially penetrates through each of the surfaces S1 to S16 and is finally imaged on the imaging surface S17.

In Embodiment 2, a total effective focal length f of the optical imaging system is 5.10 mm. TTL is a distance from the object-side surface S1 of the first lens E1 to the imaging surface S17 on the optical axis, and TTL is 7.27 mm. Semi-FOV is a half of a maximum field of view of the optical imaging system, and Semi-FOV is 40.8°. ImgH is a half of a diagonal length of an effective pixel region on the imaging surface S17, and ImgH is 4.52 mm.

Table 3 shows a table of basic parameters for the optical imaging system of Embodiment 2, and units of the curvature radius, the thickness and the focal length are all millimeter (mm). Table 4 shows high-order coefficients that can be used for each aspheric mirror surface in Embodiment 2. A surface type of each aspheric surface may be defined by formula (1) given in Embodiment 1.

TABLE 3

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4469 | | | | |
| S1 | Aspheric | 3.4299 | 0.7522 | 1.55 | 55.9 | 6.10 | 0.0122 |
| S2 | Aspheric | −104.9958 | 0.0300 | | | | 99.0000 |
| S3 | Aspheric | 2.8382 | 0.3419 | 1.68 | 19.2 | −16.77 | 0.1425 |
| S4 | Aspheric | 2.1601 | 0.7022 | | | | −0.0695 |
| S5 | Aspheric | −500.0000 | 0.2700 | 1.68 | 19.2 | −10.50 | −99.0000 |
| S6 | Aspheric | 7.2110 | 0.0392 | | | | 1.8124 |
| S7 | Aspheric | 13.1075 | 1.2217 | 1.55 | 55.9 | 5.79 | 17.5258 |
| S8 | Aspheric | −4.0215 | 0.1571 | | | | −2.2217 |
| S9 | Aspheric | −3.6978 | 0.6000 | 1.57 | 37.4 | −21.68 | 0.0761 |
| S10 | Aspheric | −5.5876 | 0.0300 | | | | 0.4370 |
| S11 | Aspheric | 1.8588 | 0.5200 | 1.55 | 55.9 | 8.14 | −0.9614 |
| S12 | Aspheric | 2.8798 | 0.8500 | | | | −1.1152 |
| S13 | Aspheric | 2.8118 | 0.4551 | 1.54 | 55.7 | −7.10 | −1.0043 |
| S14 | Aspheric | 1.5259 | 0.4938 | | | | −1.0211 |
| S15 | Spherical | Infinite | 0.2100 | 1.56 | 51.3 | | |
| S16 | Spherical | Infinite | 0.5968 | | | | |
| S17 | Spherical | Infinite | | | | | |

TABLE 4

| Surface number | A4 | A6 | A8 | A10 | A12 |
|---|---|---|---|---|---|
| S1 | 1.1244E−02 | −7.0569E−03 | −2.5539E−03 | −7.3113E−04 | −1.6329E−04 |
| S2 | 1.3534E−02 | −9.1277E−03 | −1.7918E−03 | 3.7929E−04 | −2.0449E−04 |
| S3 | −1.2715E−01 | 1.1515E−02 | 2.0768E−03 | 2.0270E−03 | 3.2995E−04 |
| S4 | −1.5773E−01 | −1.2278E−03 | −1.3356E−03 | 2.4659E−04 | 5.1061E−05 |
| S5 | −2.2480E−01 | −1.3967E−02 | −7.9881E−04 | 3.3874E−04 | −1.3523E−05 |
| S6 | −3.0105E−01 | 1.9096E−02 | −6.8573E−03 | 2.5324E−03 | −4.4205E−04 |
| S7 | −4.9743E−02 | 4.1317E−02 | −1.2587E−02 | 5.2332E−03 | −8.0664E−04 |
| S8 | −3.0610E−01 | 1.3746E−01 | −4.0384E−02 | 9.9186E−03 | 1.7207E−03 |
| S9 | 1.9162E−01 | 1.1328E−01 | −5.4699E−02 | 7.7439E−03 | −5.2335E−03 |
| S10 | −2.4227E−01 | 2.3198E−01 | −3.5754E−02 | −9.4338E−03 | −1.2311E−02 |
| S11 | −2.1564E+00 | −5.4383E−04 | 4.7459E−02 | 1.3303E−02 | 2.4382E−03 |
| S12 | −1.8376E+00 | 1.0779E−01 | 8.9267E−02 | −7.3066E−02 | 2.9871E−02 |
| S13 | −3.6691E+00 | 1.2838E+00 | −5.1783E−01 | 1.6008E−01 | −1.9125E−02 |
| S14 | −6.0965E+00 | 1.4167E+00 | −4.7720E−01 | 1.6441E−01 | −5.8372E−02 |

| Surface number | A14 | A16 | A18 | A20 |
|---|---|---|---|---|
| S1 | −4.8460E−06 | 3.1425E−06 | −4.1450E−06 | −1.7654E−05 |
| S2 | 1.7989E−04 | −6.5601E−05 | 3.1217E−05 | −1.3811E−05 |
| S3 | 3.1959E−04 | 3.4826E−05 | 4.0328E−05 | −3.1109E−06 |
| S4 | 5.6275E−05 | 2.5806E−05 | 1.1189E−05 | 9.5112E−06 |
| S5 | 2.4105E−05 | 5.0759E−06 | 3.5612E−06 | −7.1184E−07 |
| S6 | 8.4597E−05 | −6.7983E−05 | −2.2872E−05 | −2.8760E−05 |
| S7 | 2.7370E−04 | −1.4435E−04 | 2.3833E−05 | 1.5635E−06 |
| S8 | 2.8177E−03 | −1.6720E−04 | −1.4623E−04 | −3.4105E−05 |
| S9 | 1.6860E−03 | −1.1082E−03 | −8.9701E−05 | −1.4159E−04 |
| S10 | 1.8270E−03 | 6.2747E−04 | 3.5152E−04 | −2.0779E−04 |
| S11 | −4.1829E−03 | −1.6737E−03 | −6.0372E−04 | −4.1271E−04 |
| S12 | −3.2133E−03 | 6.4103E−03 | −3.1282E−03 | 1.4574E−03 |
| S13 | −2.9477E−03 | 1.9914E−03 | 1.0071E−03 | −1.3095E−03 |
| S14 | 1.4774E−02 | −4.3056E−03 | 7.2705E−03 | −2.8981E−03 |

Figure 4A:
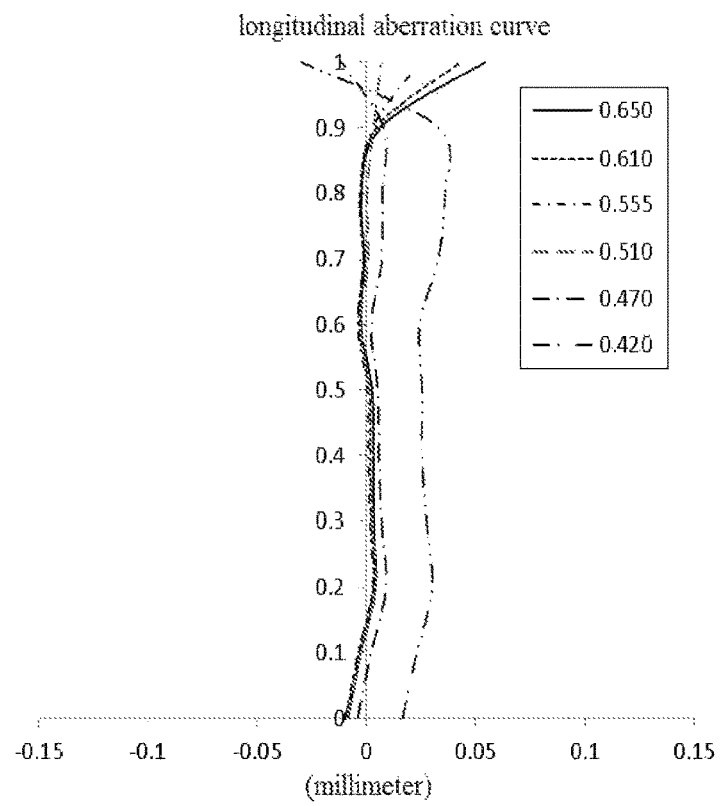
FIGS. 4A-4D show a longitudinal aberration curve, a astigmatism curve, a distortion curve and a lateral color curve of an optical imaging system according to Embodiment 2 respectively.
Figure 4B:
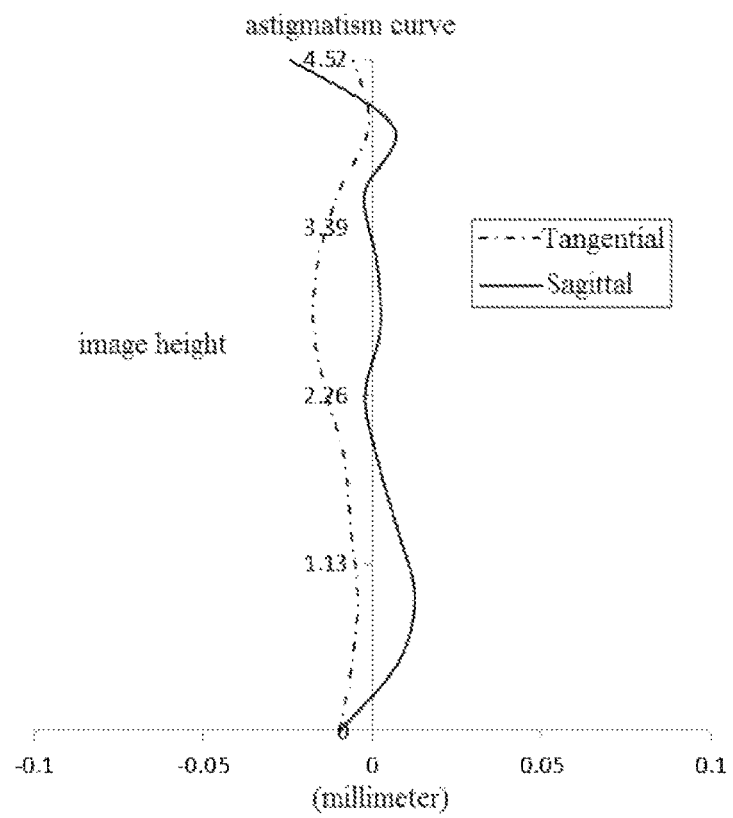
Figure 4C:
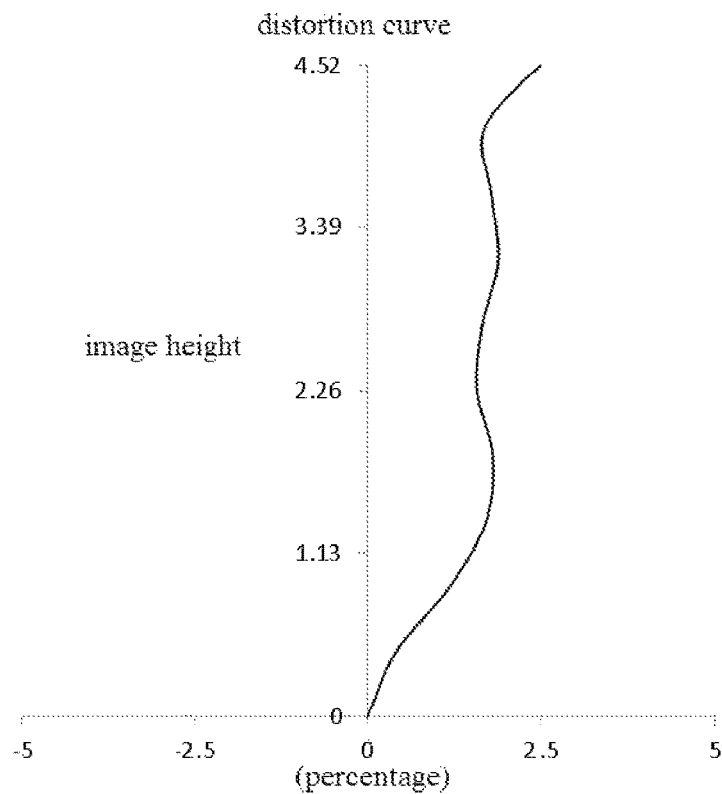
Figure 4D:
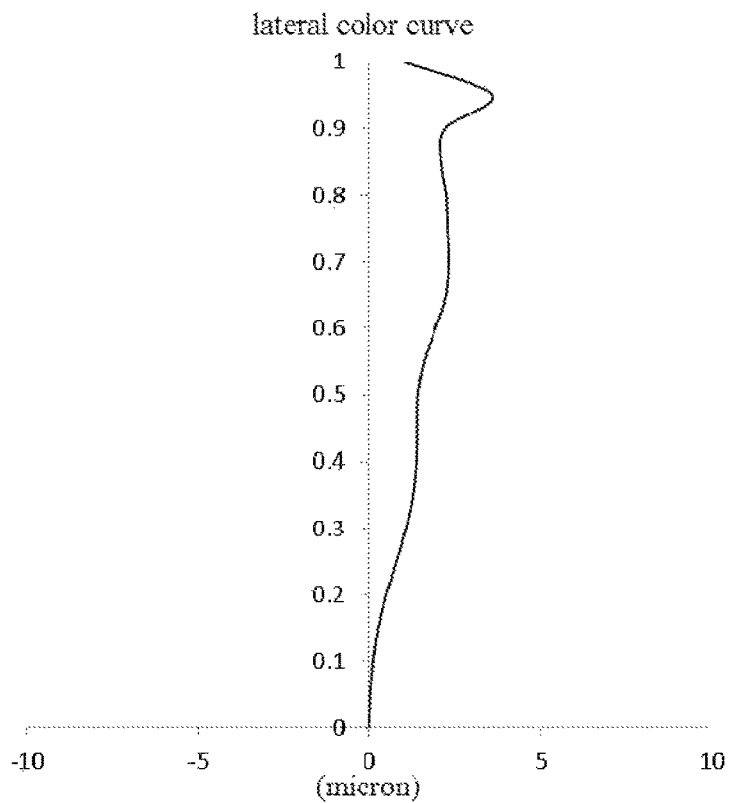

FIG. 4A shows a longitudinal aberration curve of the optical imaging system according to Embodiment 2 to represent deviation of a convergence focal point after light with different wavelengths passes through the system. FIG. 4B shows an astigmatism curve of the optical imaging system according to Embodiment 2 to represent a tangential image surface curvature and a sagittal image surface curvature. FIG. 4C shows a distortion curve of the optical imaging system according to Embodiment 2 to represent distortion values corresponding to different image heights. FIG. 4D shows a lateral color curve of the optical imaging system according to Embodiment 2 to represent deviation of different image heights on the imaging surface after the light passes through the system. According to FIGS. 4A-4D, it can be seen that the optical imaging system provided in Embodiment 2 may achieve high imaging quality.

Embodiment 3

Figure 5:
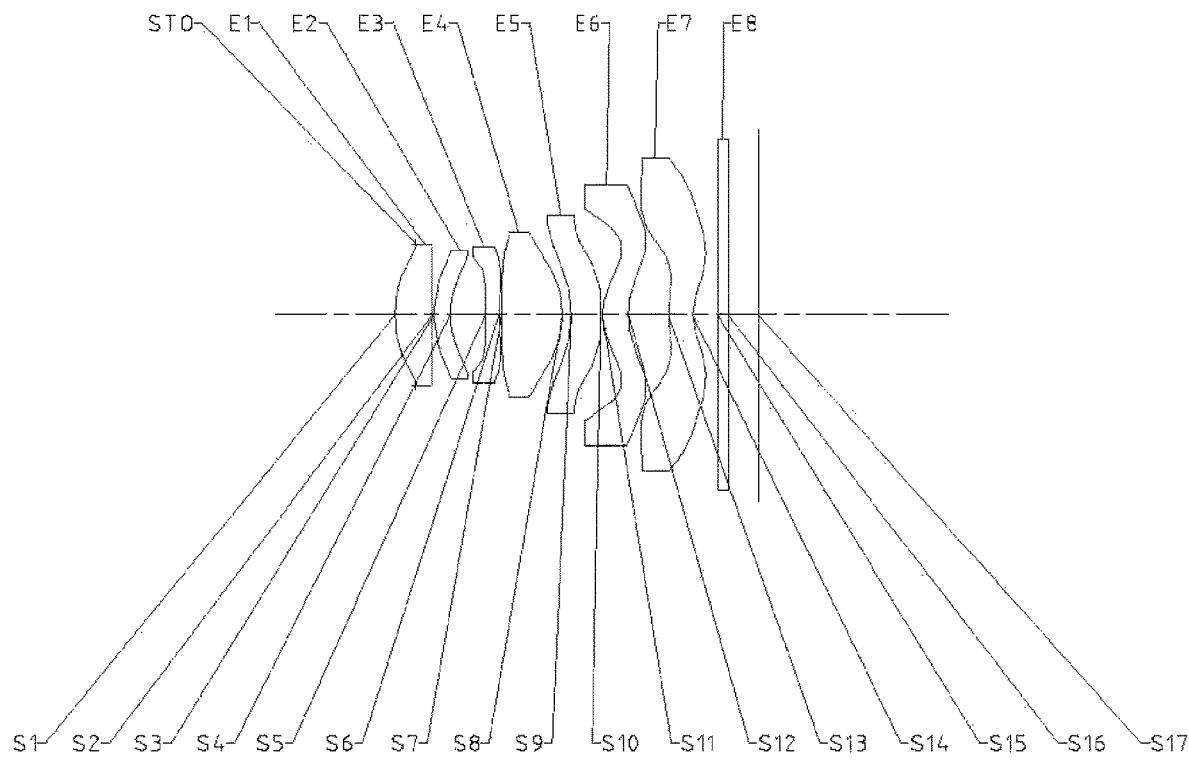
FIG. 5 shows a structure diagram of an optical imaging system according to Embodiment 3 of the disclosure.

An optical imaging system according to Embodiment 3 of the disclosure will be described below with reference to FIGS. 5-6D. FIG. 5 is a structure diagram of an optical imaging system according to Embodiment 3 of the disclosure.

As shown in FIG. 5, the optical imaging system sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a concave surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging system has an imaging surface S17. Light from an object sequentially penetrates through each of the surfaces S1 to S16 and is finally imaged on the imaging surface S17.

In Embodiment 3, a total effective focal length f of the optical imaging system is 5.10 mm. TTL is a distance from the object-side surface S1 of the first lens E1 to the imaging surface S17 on the optical axis, and TTL is 7.27 mm. Semi-FOV is a half of a maximum field of view of the optical imaging system, and Semi-FOV is 40.9°. ImgH is a half of a diagonal length of an effective pixel region on the imaging surface S17, and ImgH is 4.52 mm.

Table 5 shows a table of basic parameters for the optical imaging system of Embodiment 3, and units of the curvature radius, the thickness and the focal length are all millimeter (mm). Table 6 shows high-order coefficients that can be used for each aspheric mirror surface in Embodiment 3. A surface type of each aspheric surface may be defined by formula (1) given in Embodiment 1.

TABLE 5

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4233 | | | | |
| S1 | Aspheric | 3.5117 | 0.7412 | 1.55 | 55.9 | 6.15 | −0.0974 |
| S2 | Aspheric | −70.3695 | 0.0300 | | | | −99.0000 |
| S3 | Aspheric | 2.8265 | 0.3293 | 1.68 | 19.2 | −16.54 | −0.0857 |
| S4 | Aspheric | 2.1508 | 0.7058 | | | | 0.0041 |
| S5 | Aspheric | 17.3704 | 0.2700 | 1.68 | 19.2 | −11.65 | −98.9595 |
| S6 | Aspheric | 5.3905 | 0.0547 | | | | −1.7608 |
| S7 | Aspheric | 15.9223 | 1.2112 | 1.55 | 55.9 | 5.57 | 32.9424 |
| S8 | Aspheric | −3.6542 | 0.1787 | | | | −2.7650 |
| S9 | Aspheric | −4.2887 | 0.6000 | 1.57 | 37.4 | −7.47 | 0.7521 |
| S10 | Aspheric | 573.8093 | 0.0300 | | | | −99.0000 |
| S11 | Aspheric | 1.6785 | 0.5247 | 1.55 | 55.9 | 5.02 | −1.0120 |
| S12 | Aspheric | 3.8526 | 0.7956 | | | | −0.4050 |
| S13 | Aspheric | 2.6571 | 0.4792 | 1.54 | 55.7 | −7.00 | −0.9442 |
| S14 | Aspheric | 1.4580 | 0.5033 | | | | −1.4099 |
| S15 | Spherical | Infinite | 0.2100 | 1.56 | 51.3 | | |
| S16 | Spherical | Infinite | 0.6063 | | | | |
| S17 | Spherical | Infinite | | | | | |

TABLE 6

| Surface number | A4 | A6 | A8 | A10 | A12 |
|---|---|---|---|---|---|
| S1 | 1.7261E−02 | −5.9621E−03 | −2.3099E−03 | −7.0708E−04 | −1.4975E−04 |
| S2 | 2.2448E−02 | −1.0549E−02 | −1.8048E−03 | 3.9679E−04 | −2.4593E−04 |
| S3 | −1.2960E−01 | 1.1698E−02 | 1.7701E−03 | 2.3177E−03 | 3.1272E−04 |
| S4 | −1.6675E−01 | 2.9621E−04 | −1.3354E−03 | 4.1815E−04 | 5.4880E−05 |
| S5 | −2.3003E−01 | −1.1373E−02 | −1.0395E−03 | 4.4452E−04 | −6.9075E−05 |
| S6 | −3.2623E−01 | 1.6592E−02 | −1.4592E−03 | 2.4024E−03 | −6.5371E−04 |
| S7 | −2.5938E−02 | 3.9241E−02 | −9.8454E−03 | 4.9726E−03 | −8.4020E−04 |
| S8 | −2.8383E−01 | 1.3602E−01 | −2.4346E−02 | 1.4227E−02 | 4.3305E−03 |
| S9 | 1.3485E−01 | 9.8525E−02 | −5.4642E−02 | 2.9208E−03 | −6.6607E−03 |
| S10 | −7.8531E−01 | 2.9980E−01 | −4.9563E−02 | 1.1167E−02 | −1.2373E−02 |
| S11 | −2.2291E+00 | 3.6579E−02 | 4.5417E−02 | 2.1219E−02 | 5.3311E−04 |
| S12 | −1.5163E+00 | −4.8460E−03 | 1.5089E−01 | −1.0431E−01 | 3.8992E−02 |

TABLE 6-continued

| | | | | |
|---|---|---|---|---|
| S13 | −3.8162E+00 | 1.3077E+00 | −5.2414E−01 | 1.5604E−01 | −1.5243E−02 |
| S14 | −4.5089E+00 | 1.1959E+00 | −4.2848E−01 | 1.4939E−01 | −5.0901E−02 |

| Surface number | A14 | A16 | A18 | A20 |
|---|---|---|---|---|
| S1 | −5.8730E−06 | 9.1777E−06 | 3.5196E−06 | −1.0526E−05 |
| S2 | 1.9894E−04 | −8.6796E−05 | 3.5964E−05 | −1.9862E−05 |
| S3 | 3.5418E−04 | 2.1495E−05 | 4.4743E−05 | −6.3774E−06 |
| S4 | 5.6597E−05 | 1.9354E−05 | 8.7886E−06 | 1.0015E−05 |
| S5 | 4.3540E−05 | −8.2020E−06 | 6.2119E−06 | −6.6816E−07 |
| S6 | 2.0359E−04 | −9.1556E−05 | −8.2461E−07 | −7.8709E−06 |
| S7 | 4.2021E−04 | −2.3602E−04 | 5.4814E−05 | −2.8657E−06 |
| S8 | 3.8725E−03 | −3.4699E−05 | −8.5433E−05 | −6.1390E−05 |
| S9 | 1.4754E−03 | −1.3085E−03 | −8.3288E−05 | −1.9548E−04 |
| S10 | 2.0172E−03 | −3.6525E−04 | 4.3346E−04 | −1.2006E−04 |
| S11 | −3.3098E−03 | −2.4688E−03 | −3.0092E−04 | −5.9331E−04 |
| S12 | −8.3380E−03 | 7.7283E−03 | −5.2066E−03 | 1.5421E−03 |
| S13 | −5.8666E−03 | 2.8039E−03 | 8.6646E−04 | −9.8299E−04 |
| S14 | 1.1031E−02 | −5.9772E−03 | 6.6282E−03 | −1.7589E−03 |

Figure 6A:
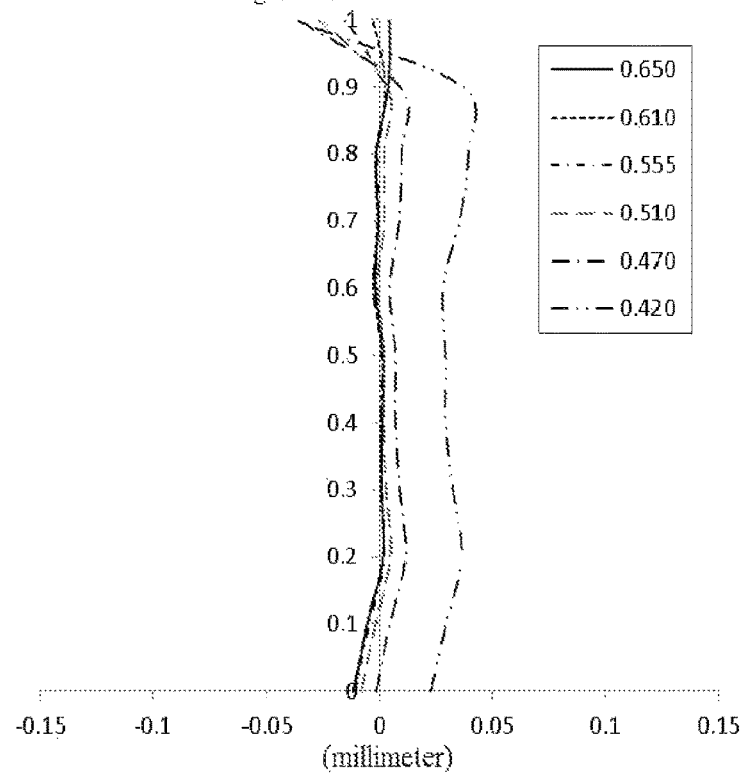
FIGS. 6A-6D show a longitudinal aberration curve, a astigmatism curve, a distortion curve and a lateral color curve of an optical imaging system according to Embodiment 3 respectively.
Figure 6B:
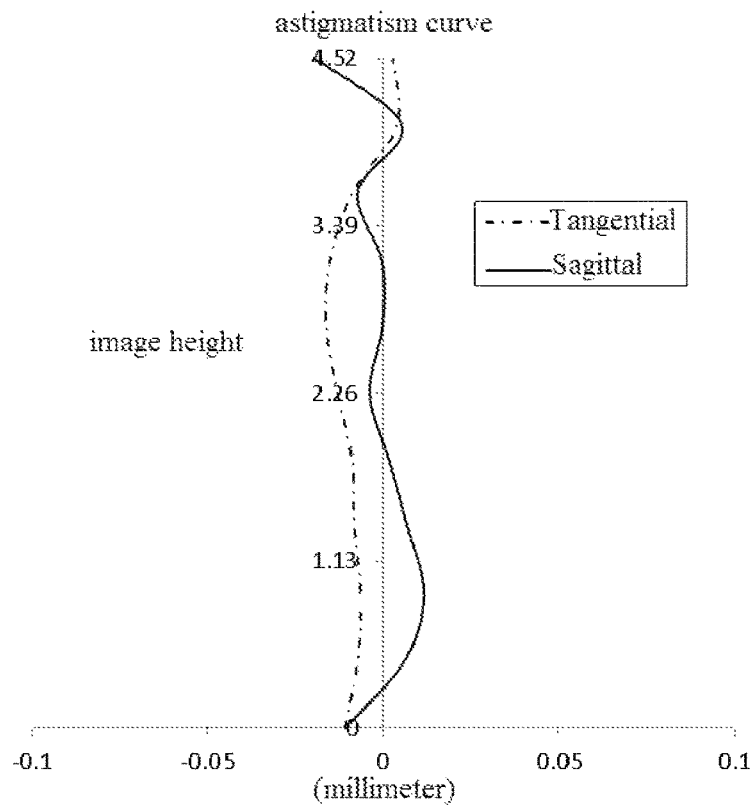
Figure 6C:
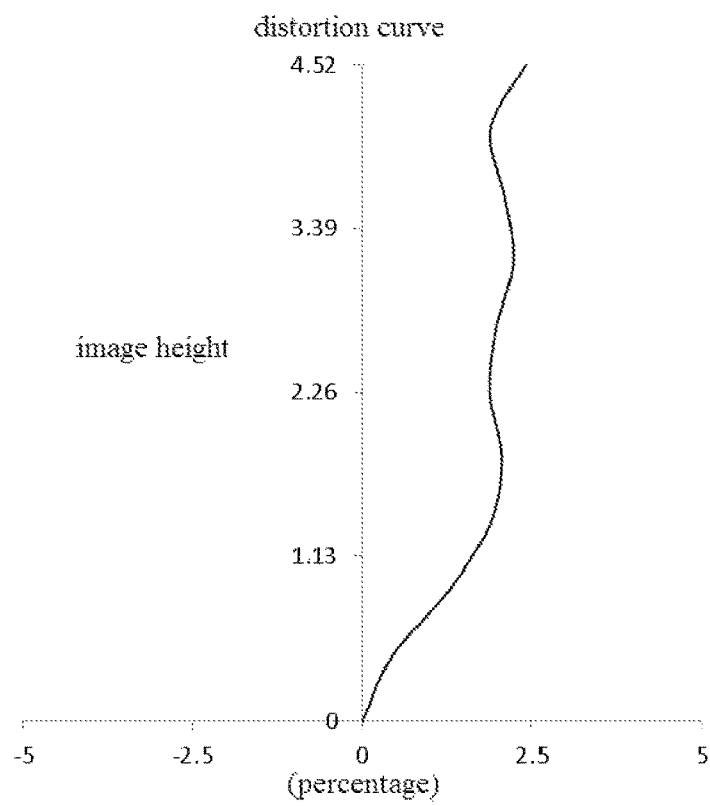
Figure 6D:
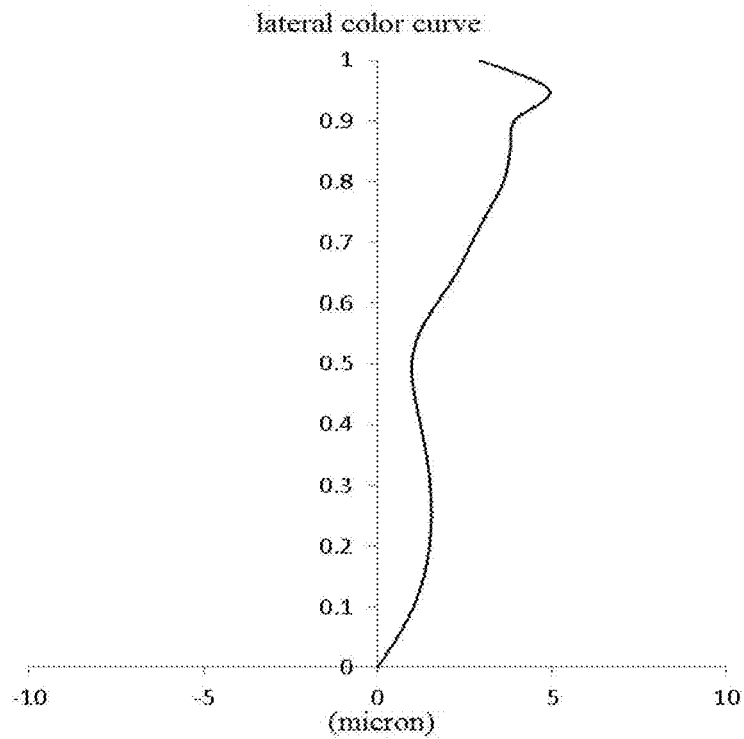

FIG. 6A shows a longitudinal aberration curve of the optical imaging system according to Embodiment 3 to represent deviation of a convergence focal point after light with different wavelengths passes through the system. FIG. 6B shows an astigmatism curve of the optical imaging system according to Embodiment 3 to represent a tangential image surface curvature and a sagittal image surface curvature. FIG. 6C shows a distortion curve of the optical imaging system according to Embodiment 3 to represent distortion values corresponding to different image heights. FIG. 6D shows a lateral color curve of the optical imaging system according to Embodiment 3 to represent deviation of different image heights on the imaging surface after the light passes through the system. According to FIGS. 6A-6D, it can be seen that the optical imaging system provided in Embodiment 3 may achieve high imaging quality.

Embodiment 4

Figure 7:
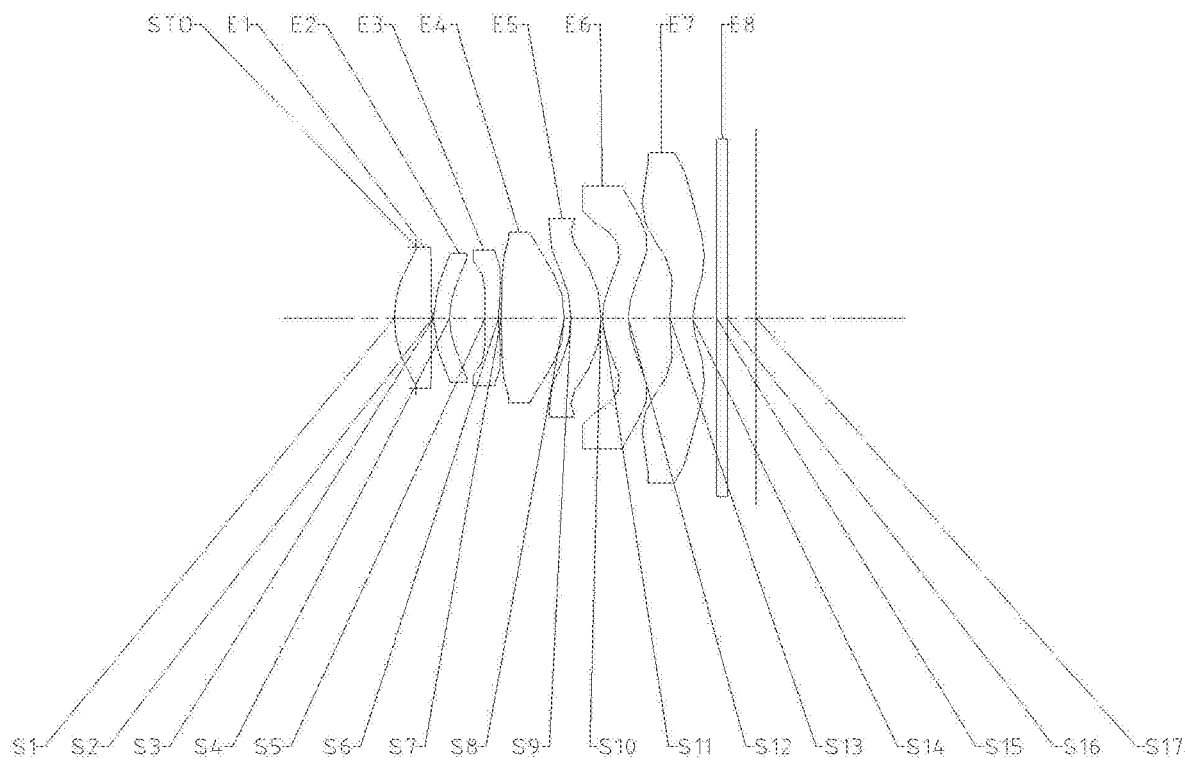
FIG. 7 shows a structure diagram of an optical imaging system according to Embodiment 4 of the disclosure.

An optical imaging system according to Embodiment 4 of the disclosure will be described below with reference to FIGS. 7-8D. FIG. 7 is a structure diagram of an optical imaging system according to Embodiment 4 of the disclosure.

As shown in FIG. 7, the optical imaging system sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a positive refractive power, an object-side surface S9 thereof is a concave surface, while an image-side surface S10 is a convex surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging system has an imaging surface S17. Light from an object sequentially penetrates through each of the surfaces S1 to S16 and is finally imaged on the imaging surface S17.

In Embodiment 4, a total effective focal length f of the optical imaging system is 5.08 mm. TTL is a distance from the object-side surface S1 of the first lens E1 to the imaging surface S17 on the optical axis, and TTL is 7.27 mm. Semi-FOV is a half of a maximum field of view of the optical imaging system, and Semi-FOV is 41.0°. ImgH is a half of a diagonal length of an effective pixel region on the imaging surface S17, and ImgH is 4.52 mm.

Table 7 shows a table of basic parameters for the optical imaging system of Embodiment 4, and units of the curvature radius, the thickness and the focal length are all millimeter (mm). Table 8 shows high-order coefficients that can be used for each aspheric mirror surface in Embodiment 4. A surface type of each aspheric surface may be defined by formula (1) given in Embodiment 1.

TABLE 7

| | | | | Material | | | |
|---|---|---|---|---|---|---|---|
| Surface number | Surface type | Curvature radius | Thickness | Refractive index | Abbe number | Focal length | Conic coefficient |
| OBJ | Spherical | Infinite | Infinite | | | | |
| STO | Spherical | Infinite | −0.4241 | | | | |
| S1 | Aspheric | 3.4790 | 0.7445 | 1.55 | 55.9 | 6.15 | 0.0000 |
| S2 | Aspheric | −87.9435 | 0.0300 | | | | −99.0000 |
| S3 | Aspheric | 2.8446 | 0.3295 | 1.68 | 19.2 | −16.99 | 0.0539 |

TABLE 7-continued

| Surface number | Surface type | Curvature radius | Thickness | Material Refractive index | Abbe number | Focal length | Conic coefficient |
|---|---|---|---|---|---|---|---|
| S4  | Aspheric  | 2.1739  | 0.7206 |      |      |        | −0.1440  |
| S5  | Aspheric  | 18.8588 | 0.2700 | 1.68 | 19.2 | −11.14 | −90.8649 |
| S6  | Aspheric  | 5.3558  | 0.0524 |      |      |        | −1.5504  |
| S7  | Aspheric  | 13.6511 | 1.2647 | 1.55 | 55.9 | 6.48   | 26.8584  |
| S8  | Aspheric  | −4.6153 | 0.1348 |      |      |        | 0.0000   |
| S9  | Aspheric  | −4.0032 | 0.6000 | 1.57 | 37.4 | 76.49  | 0.3144   |
| S10 | Aspheric  | −3.8660 | 0.0300 |      |      |        | −4.0789  |
| S11 | Aspheric  | 1.9530  | 0.5200 | 1.55 | 55.9 | 12.64  | −0.9517  |
| S12 | Aspheric  | 2.4687  | 0.8324 |      |      |        | −1.0000  |
| S13 | Aspheric  | 3.0754  | 0.4550 | 1.54 | 55.7 | −6.99  | −1.0000  |
| S14 | Aspheric  | 1.6030  | 0.4866 |      |      |        | −1.0000  |
| S15 | Spherical | Infinite | 0.2100 | 1.56 | 51.3 |       |          |
| S16 | Spherical | Infinite | 0.5896 |      |      |        |          |
| S17 | Spherical | Infinite |        |      |      |        |          |

TABLE 8

| Surface number | A4 | A6 | A8 | A10 | A12 |
|---|---|---|---|---|---|
| S1  | 1.5163E−02  | −7.1297E−03 | −2.7237E−03 | −8.1771E−04 | −1.6447E−04 |
| S2  | 1.7166E−02  | −1.0527E−02 | −2.1527E−03 | 5.0732E−04  | −2.6672E−04 |
| S3  | −1.3161E−01 | 1.0575E−02  | 9.4963E−04  | 1.9521E−03  | 1.4473E−04  |
| S4  | −1.6250E−01 | 2.0791E−03  | −9.4767E−04 | 6.2511E−04  | 1.4943E−04  |
| S5  | −2.3680E−01 | −1.2580E−02 | −1.1106E−03 | 3.6203E−04  | −7.4877E−05 |
| S6  | −3.2776E−01 | 1.6531E−02  | −2.2764E−03 | 2.3495E−03  | −5.0507E−04 |
| S7  | −4.1002E−02 | 3.5843E−02  | −1.2040E−02 | 5.7897E−03  | −8.7817E−04 |
| S8  | −3.3227E−01 | 1.5010E−01  | −4.7590E−02 | 1.2669E−02  | 1.1440E−03  |
| S9  | 1.7638E−01  | 1.3221E−01  | −5.5394E−02 | 1.1833E−02  | −5.9250E−03 |
| S10 | −1.1914E−01 | 2.3060E−01  | −1.0774E−02 | −1.5952E−02 | −1.1120E−02 |
| S11 | −2.1467E+00 | 4.7055E−03  | 7.7511E−02  | 2.6477E−02  | 9.0458E−03  |
| S12 | −2.4271E+00 | 2.3433E−01  | 6.1077E−02  | −6.6363E−02 | 2.0557E−02  |
| S13 | −3.5557E+00 | 1.3355E+00  | −5.6628E−01 | 1.8407E−01  | −3.6856E−02 |
| S14 | −6.2883E+00 | 1.5238E+00  | −5.2429E−01 | 1.7954E−01  | −7.3371E−02 |

| Surface number | A14 | A16 | A18 | A20 |
|---|---|---|---|---|
| S1  | −3.8171E−06 | 9.9537E−06  | 1.8536E−06  | −1.0956E−05 |
| S2  | 2.2065E−04  | −8.9609E−05 | 3.9308E−05  | −2.3876E−05 |
| S3  | 2.8338E−04  | −7.5058E−06 | 3.5857E−05  | −8.3808E−06 |
| S4  | 1.0533E−04  | 4.1901E−05  | 1.9318E−05  | 1.1843E−05  |
| S5  | 3.9377E−05  | 9.6020E−07  | 5.6791E−06  | −4.1452E−07 |
| S6  | 1.4716E−04  | −7.0818E−05 | −1.3651E−05 | −4.5916E−06 |
| S7  | 2.3807E−04  | −1.3347E−04 | 8.9956E−06  | 7.4522E−06  |
| S8  | 3.0413E−03  | −1.4454E−04 | −1.6964E−04 | −3.4238E−05 |
| S9  | 2.2542E−03  | −1.0828E−03 | −4.1723E−05 | −1.1760E−04 |
| S10 | 1.9340E−03  | 1.2360E−03  | 4.5623E−04  | −2.4122E−04 |
| S11 | −3.1062E−03 | −1.9048E−03 | −7.9702E−04 | −3.3945E−04 |
| S12 | 1.7605E−03  | 6.5719E−03  | −2.5545E−03 | 6.0579E−04  |
| S13 | 3.1149E−03  | 1.1462E−03  | 2.8654E−04  | −6.8083E−04 |
| S14 | 2.0035E−02  | −3.3217E−03 | 7.0324E−03  | −4.7103E−03 |

Figure 8A:
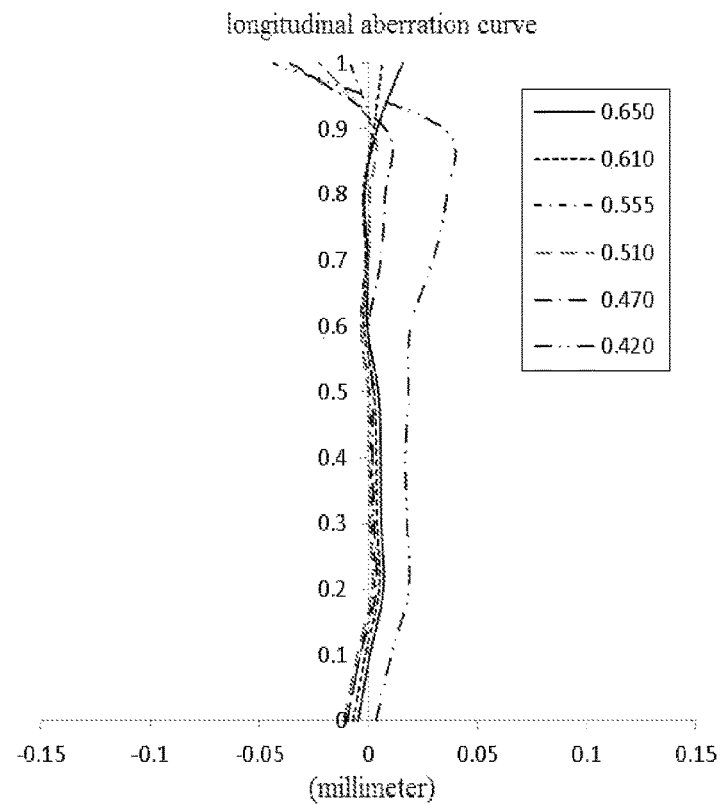
FIGS. 8A-8D show a longitudinal aberration curve, a astigmatism curve, a distortion curve and a lateral color curve of an optical imaging system according to Embodiment 4 respectively.
Figure 8B:
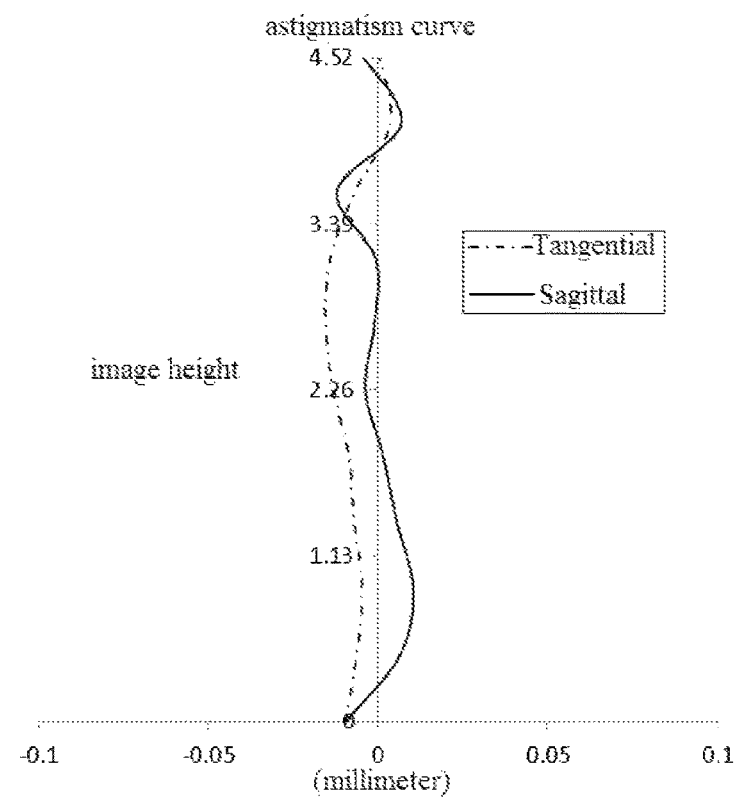
Figure 8C:
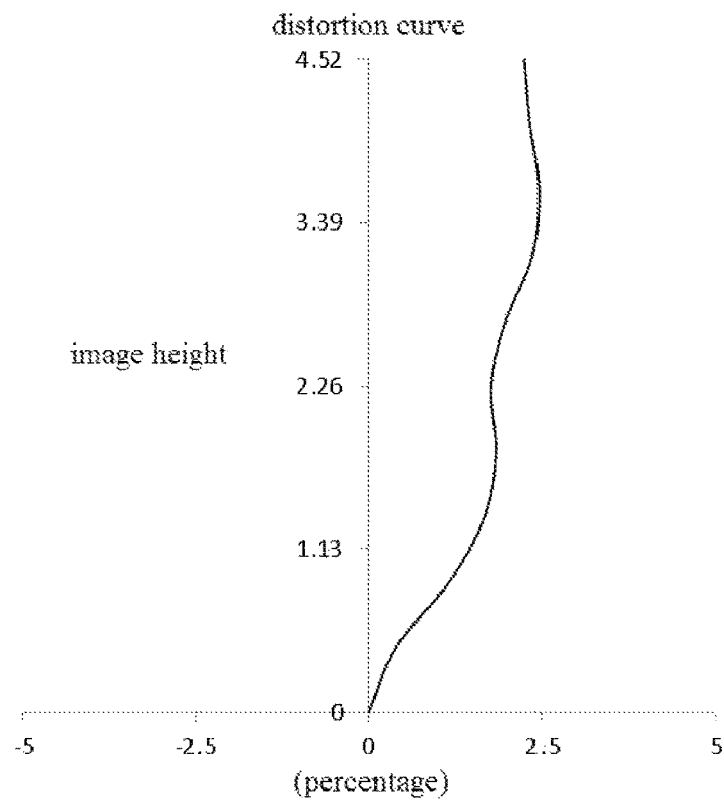
Figure 8D:
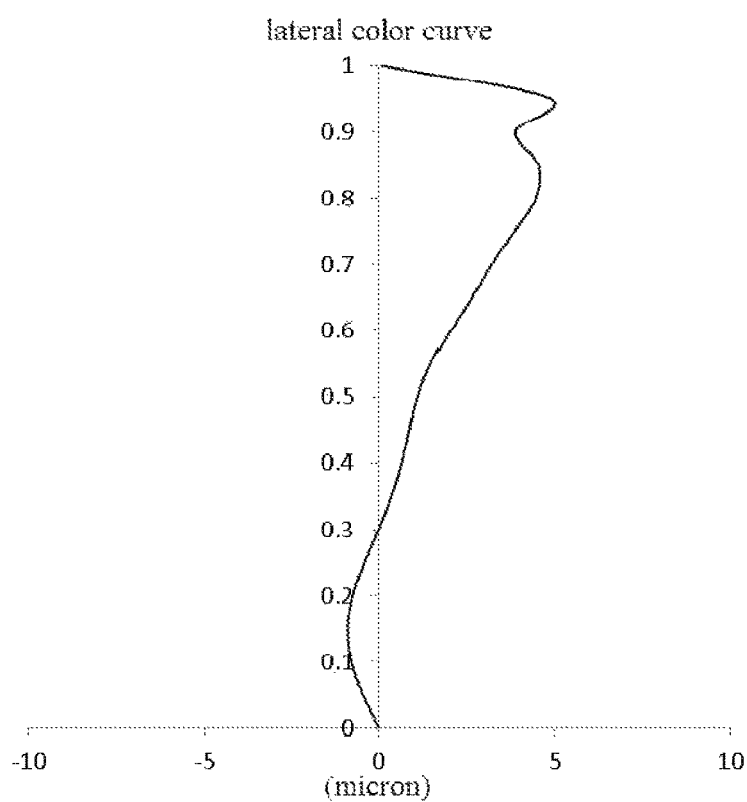

FIG. 8A shows a longitudinal aberration curve of the optical imaging system according to Embodiment 4 to represent deviation of a convergence focal point after light with different wavelengths passes through the system. FIG. 8B shows an astigmatism curve of the optical imaging system according to Embodiment 4 to represent a tangential image surface curvature and a sagittal image surface curvature. FIG. 8C shows a distortion curve of the optical imaging system according to Embodiment 4 to represent distortion values corresponding to different image heights. FIG. 8D shows a lateral color curve of the optical imaging system according to Embodiment 4 to represent deviation of different image heights on the imaging surface after the light passes through the system. According to FIGS. 8A-8D, it can be seen that the optical imaging system provided in Embodiment 4 may achieve high imaging quality.

Embodiment 5

Figure 9:
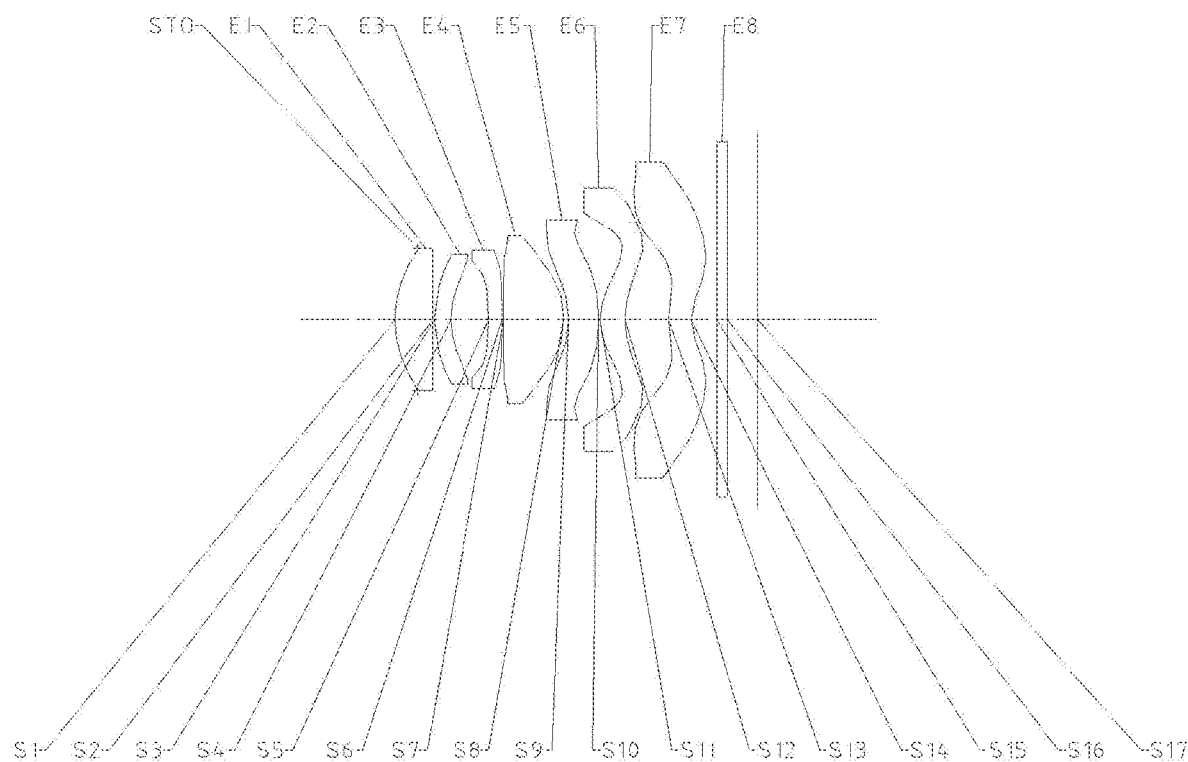
FIG. 9 shows a structure diagram of an optical imaging system according to Embodiment 5 of the disclosure.

An optical imaging system according to Embodiment 5 of the disclosure will be described below with reference to FIGS. 9-10C. FIG. 9 is a structure diagram of an optical imaging system according to Embodiment 5 of the disclosure.

As shown in FIG. 9, the optical imaging system sequentially includes, from an object side to an image side along an optical axis, diaphragm STO, a first lens E1, a second lens E2, a third lens E3, a fourth lens E4, a fifth lens E5, a sixth lens E6, a seventh lens E7 and an optical filter E8.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a negative refractive power, an object-side surface S5 thereof is a concave surface, while an image-side surface S6 is a convex surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a convex surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging system has an imaging surface S17. Light from an object sequentially penetrates through each of the surfaces S1 to S16 and is finally imaged on the imaging surface S17.

In Embodiment 5, a total effective focal length f of the optical imaging system is 5.08 mm. TTL is a distance from the object-side surface S1 of the first lens E1 to the imaging surface S17 on the optical axis, and TTL is 7.27 mm. Semi-FOV is a half of a maximum field of view of the optical imaging system, and Semi-FOV is 40.9°. ImgH is a half of a diagonal length of an effective pixel region on the imaging surface S17, and ImgH is 4.52 mm.

Table 9 shows a table of basic parameters for the optical imaging system of Embodiment 5, and units of the curvature radius, the thickness and the focal length are all millimeter (mm). Table 10 shows high-order coefficients that can be used for each aspheric mirror surface in Embodiment 5. A surface type of each aspheric surface may be defined by formula (1) given in Embodiment 1.

TABLE 9

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.4546 | | | | |
| S1 | Aspheric | 3.4111 | 0.7527 | 1.55 | 55.9 | 6.07 | −0.0122 |
| S2 | Aspheric | −105.6527 | 0.0300 | | | | −99.0000 |
| S3 | Aspheric | 2.9024 | 0.3312 | 1.68 | 19.2 | −17.28 | −0.1120 |
| S4 | Aspheric | 2.2184 | 0.7635 | | | | 0.1370 |
| S5 | Aspheric | −10.7421 | 0.2700 | 1.68 | 19.2 | −17.01 | −99.0000 |
| S6 | Aspheric | −162.0458 | 0.0300 | | | | 20.9133 |
| S7 | Aspheric | 37.9869 | 1.2019 | 1.55 | 55.9 | 6.72 | 99.0000 |
| S8 | Aspheric | −4.0145 | 0.0987 | | | | −0.2351 |
| S9 | Aspheric | −3.2353 | 0.6000 | 1.57 | 37.4 | −10.12 | −0.6255 |
| S10 | Aspheric | −7.8670 | 0.0300 | | | | 0.9867 |
| S11 | Aspheric | 1.7988 | 0.5000 | 1.55 | 55.9 | 5.92 | −0.9826 |
| S12 | Aspheric | 3.6615 | 0.8706 | | | | −0.5166 |
| S13 | Aspheric | 2.4476 | 0.4500 | 1.54 | 55.7 | −6.95 | −1.0780 |
| S14 | Aspheric | 1.3832 | 0.5142 | | | | −1.2205 |
| S15 | Spherical | Infinite | 0.2100 | 1.56 | 51.3 | | |
| S16 | Spherical | Infinite | 0.6172 | | | | |
| S17 | Spherical | Infinite | | | | | |

TABLE 10

| Surface number | A4 | A6 | A8 | A10 | A12 |
|---|---|---|---|---|---|
| S1 | 1.7481E−02 | −5.4832E−03 | −1.8032E−03 | −4.1482E−04 | −5.7240E−05 |
| S2 | 1.4683E−02 | −4.3493E−03 | −1.4768E−03 | 9.3210E−04 | −2.8587E−04 |
| S3 | −1.2889E−01 | 1.6344E−02 | 2.1327E−03 | 2.3033E−03 | 1.8039E−04 |
| S4 | −1.8015E−01 | −3.5850E−04 | −9.4350E−04 | 4.9089E−04 | 1.1678E−04 |
| S5 | −2.0017E−01 | −2.4549E−02 | −1.4676E−03 | 2.8055E−04 | 2.5503E−04 |
| S6 | −1.2953E−01 | −8.8363E−03 | 2.6152E−03 | 8.1590E−04 | 8.2846E−04 |
| S7 | 9.3059E−04 | 3.4023E−02 | −6.3180E−03 | 2.2198E−03 | 1.2737E−03 |
| S8 | −4.3394E−01 | 1.6733E−01 | −3.3479E−02 | 9.0354E−03 | −1.1065E−03 |
| S9 | 2.8346E−01 | 1.0523E−01 | −5.0169E−02 | 1.0563E−02 | −4.7706E−03 |
| S10 | −2.4194E−01 | 2.1445E−01 | −1.7085E−02 | 8.0923E−04 | −9.7778E−03 |
| S11 | −2.1329E+00 | −7.3903E−02 | 4.8445E−02 | 2.4027E−02 | 2.3793E−03 |
| S12 | −1.7659E+00 | 2.7110E−03 | 1.3223E−01 | −1.0894E−01 | 2.0317E−02 |
| S13 | −4.2319E+00 | 1.5275E+00 | −5.8994E−01 | 1.6697E−01 | −1.4735E−02 |
| S14 | −5.6364E+00 | 1.4275E+00 | −4.6366E−01 | 1.8790E−01 | −6.2115E−02 |

TABLE 10-continued

| Surface number | A14 | A16 | A18 | A20 |
|---|---|---|---|---|
| S1 | 2.4291E−05 | 1.4163E−05 | 1.0197E−05 | −9.9601E−06 |
| S2 | 2.5514E−04 | −9.1793E−05 | 4.6474E−05 | −2.4201E−05 |
| S3 | 3.3291E−04 | 8.1483E−06 | 5.1460E−05 | −6.5828E−06 |
| S4 | 7.4792E−05 | 3.4924E−05 | 1.6248E−05 | 1.3602E−05 |
| S5 | 8.4197E−06 | 1.4143E−05 | −1.1941E−05 | −5.2732E−06 |
| S6 | −5.6383E−04 | 1.3047E−04 | −5.8604E−05 | −4.4287E−07 |
| S7 | −7.8539E−04 | 4.7374E−04 | −2.1264E−04 | 4.3507E−05 |
| S8 | 2.6348E−03 | 6.5834E−04 | −4.4044E−05 | −4.8138E−05 |
| S9 | 2.0333E−03 | −3.6999E−04 | −4.8264E−05 | 4.4524E−05 |
| S10 | 1.5472E−03 | 2.4960E−04 | 3.4272E−04 | −9.0148E−05 |
| S11 | −3.0428E−03 | −1.9505E−03 | −6.1829E−04 | −4.1496E−04 |
| S12 | −2.1394E−03 | 4.0868E−03 | −4.9025E−03 | 7.4417E−04 |
| S13 | −9.8511E−03 | 2.6616E−03 | 1.4482E−03 | −7.9050E−04 |
| S14 | 1.2054E−02 | −7.0325E−03 | 7.8636E−03 | −2.1682E−03 |

Figure 10A:
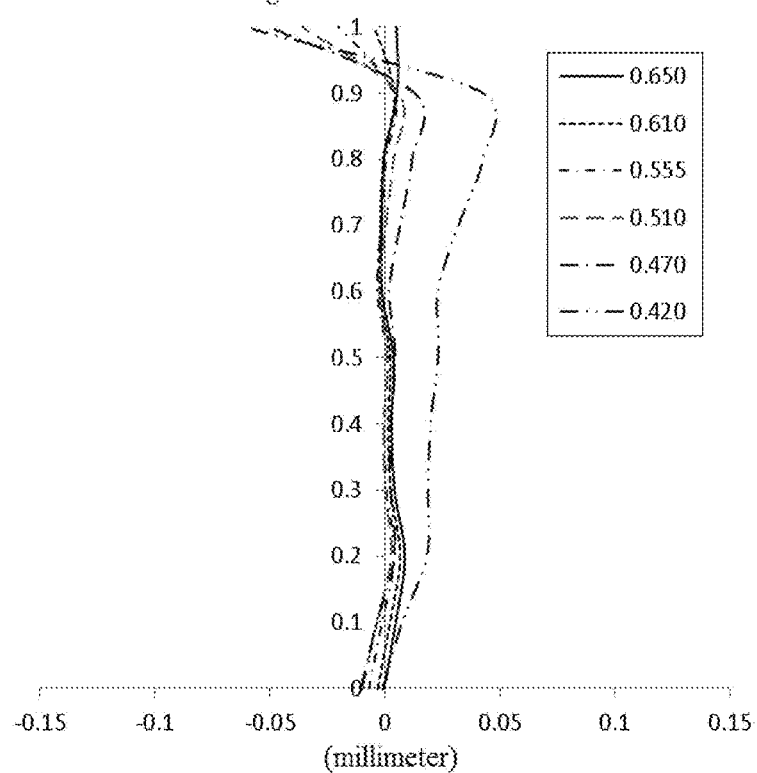
FIGS. 10A-10D show a longitudinal aberration curve, a astigmatism curve, a distortion curve and a lateral color curve of an optical imaging system according to Embodiment 5 respectively.
Figure 10B:
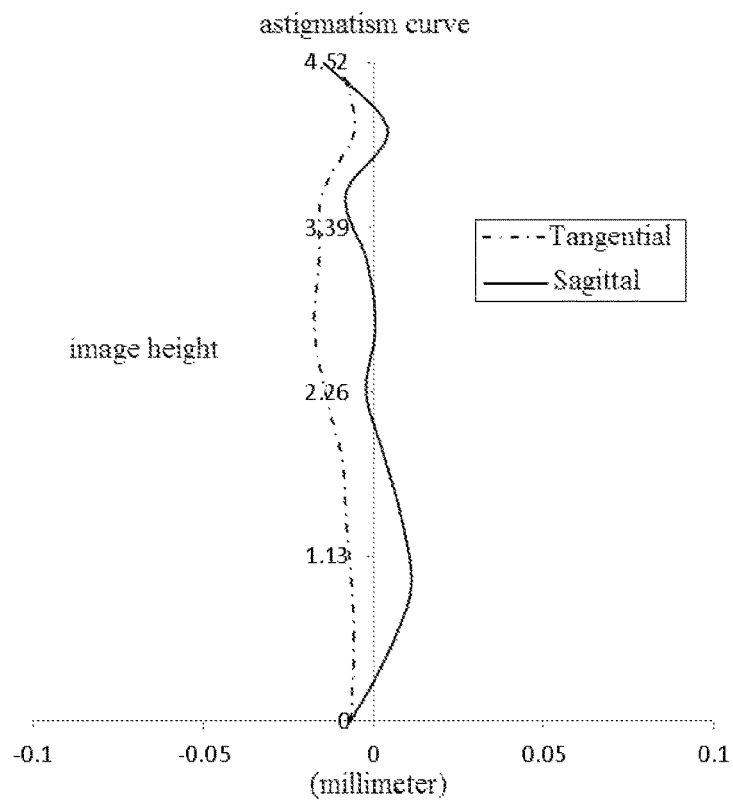
Figure 10C:
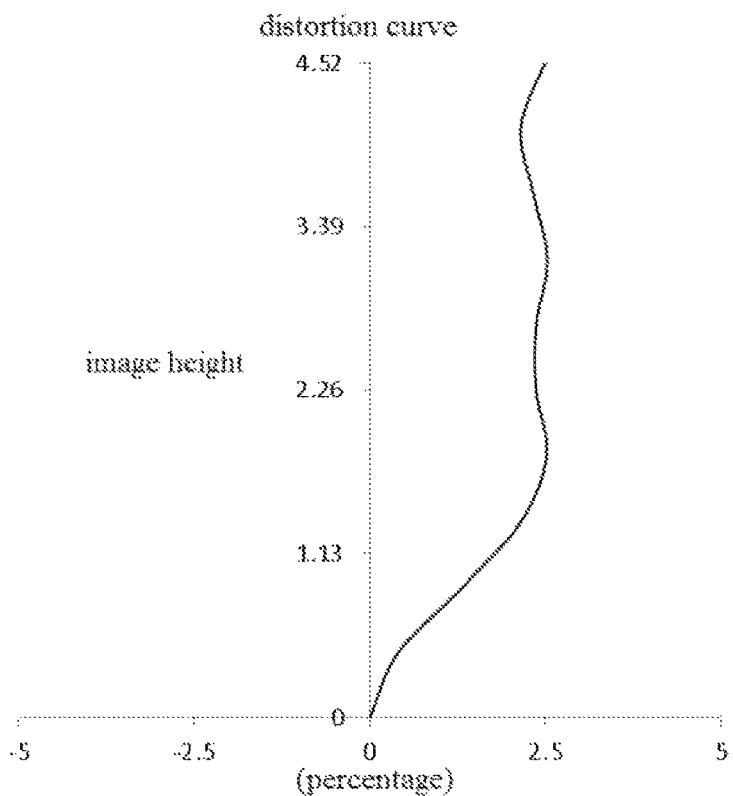
Figure 10D:
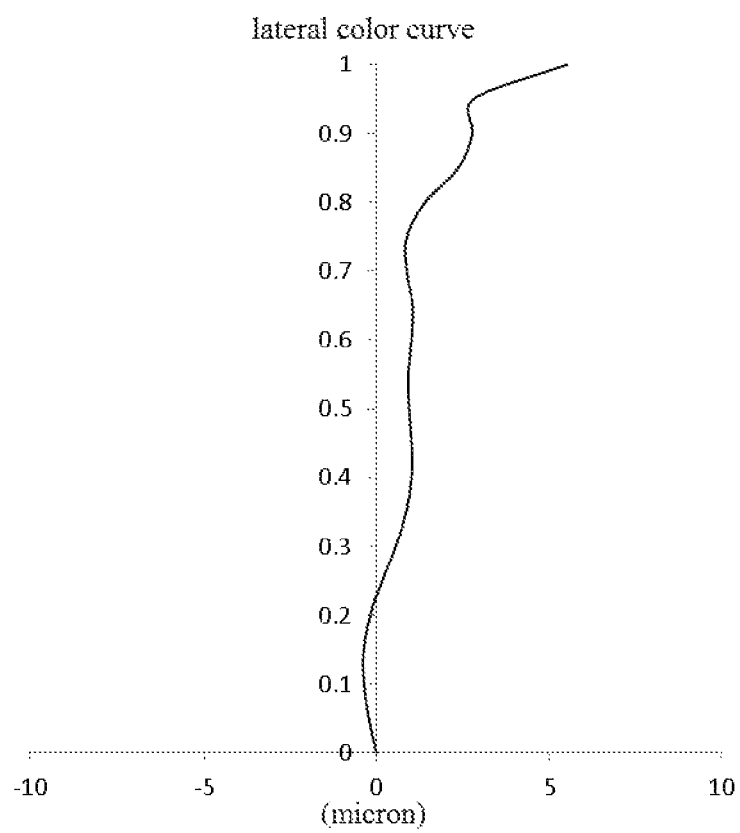

FIG. 10A shows a longitudinal aberration curve of the optical imaging system according to Embodiment 5 to represent deviation of a convergence focal point after light with different wavelengths passes through the system. FIG. 10B shows an astigmatism curve of the optical imaging system according to Embodiment 5 to represent a tangential image surface curvature and a sagittal image surface curvature. FIG. 10C shows a distortion curve of the optical imaging system according to Embodiment 5 to represent distortion values corresponding to different image heights. FIG. 10D shows a lateral color curve of the optical imaging system according to Embodiment 5 to represent deviation of different image heights on the imaging surface after the light passes through the system. According to FIGS. 10A-10D, it can be seen that the optical imaging system provided in Embodiment 5 may achieve high imaging quality.

From the above, Embodiment 1 to Embodiment 5 meet a relationship shown in Table 11 respectively.

TABLE 11

| Conditional expression | embodiment | | | | |
|---|---|---|---|---|---|
| | 1 | 2 | 3 | 4 | 5 |
| f2/f1 | −2.61 | −2.75 | −2.69 | −2.76 | −2.85 |
| f3/f4 | −2.55 | −1.81 | −2.09 | −1.72 | −2.53 |
| T67/T23 | 1.14 | 1.21 | 1.13 | 1.16 | 1.14 |
| TTL/CT4 | 5.98 | 5.95 | 6.00 | 5.75 | 6.05 |
| R9/R11 | −1.95 | −1.99 | −2.56 | −2.05 | −1.80 |
| R8/R4 | −1.66 | −1.86 | −1.70 | −2.12 | −1.81 |
| (R12 − R13)/R14 | 3.73 | 3.73 | 4.46 | 3.46 | 4.42 |
| T34/T56 | 2.50 | 1.31 | 1.82 | 1.75 | 1.00 |
| CT5/T45 | 5.85 | 3.82 | 3.36 | 4.45 | 6.08 |
| f34/f12 | 1.22 | 1.35 | 1.13 | 1.62 | 1.24 |
| SAG22/SAG21 | 1.06 | 0.99 | 1.03 | 1.03 | 1.02 |
| f/EPD | 1.50 | 1.50 | 1.50 | 1.50 | 1.50 |
| V2 − V3 | 38.40 | 38.40 | 38.40 | 38.40 | 38.40 |
| V5 | 37.40 | 37.40 | 37.40 | 37.40 | 37.40 |

The disclosure also provides an imaging device, which may use a Charge-Coupled Device (CCD) or a Complementary Metal Oxide Semiconductor (CMOS) as an electronic photosensitive element. The imaging device may be an independent imaging device such as a digital camera, or may be an imaging module integrated into a mobile electronic device such as a mobile phone. The imaging device is provided with the above-mentioned optical imaging system.

The above is only the description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What is claimed is:

1. An optical imaging system, sequentially comprising, from an object side to an image side along an optical axis:
    a diaphragm;
    a first lens with a refractive power, an image-side surface thereof being a convex surface;
    a second lens with a refractive power;
    a third lens with a negative refractive power;
    a fourth lens with a refractive power, an image-side surface thereof being a convex surface;
    a fifth lens with a refractive power, an object-side surface thereof being a concave surface;
    a sixth lens with a refractive power; and
    a seventh lens with a refractive power,
    wherein EPD is an entrance pupil diameter of the optical imaging system, and a total effective focal length f of the optical imaging system and the EPD satisfy: f/EPD≤1.5; and
    at least one of an object-side surface of the first lens to an image-side surface of the seventh lens is an aspheric surface;
    TTL is a distance from the object-side surface of the first lens to an imaging surface of the optical imaging system on the optical axis, and the TTL and a center thickness CT4 of the fourth lens on the optical axis satisfy: 5.5<TTL/CT4<6.5.

2. The optical imaging system according to claim 1, wherein Semi-FOV is a half of a maximum field of view of the optical imaging system, and the Semi-FOV satisfies: 40°<Semi-FOV<45°.

3. The optical imaging system according to claim 1, wherein an effective focal length f1 of the first lens and an effective focal length f2 of the second lens satisfy: −3.0<f2/f1<−2.5.

4. The optical imaging system according to claim 1, wherein an effective focal length f3 of the third lens and an effective focal length f4 of the fourth lens satisfy: −3.0<f3/f4<−1.5.

5. The optical imaging system according to claim 1, wherein a spacing distance T67 of the sixth lens and the seventh lens on the optical axis and a spacing distance T23 of the second lens and the third lens on the optical axis satisfy: 1.0<T67/T23<1.5.

6. The optical imaging system according to claim 1, wherein a curvature radius R9 of the object-side surface of the fifth lens and a curvature radius R11 of an object-side surface of the sixth lens satisfy: −3.0<R9/R11<−1.5.

7. The optical imaging system according to claim 1, wherein a curvature radius R8 of the image-side surface of the fourth lens and a curvature radius R4 of an image-side surface of the second lens satisfy: −2.5<R8/R4<−1.5.

8. The optical imaging system according to claim 1, wherein a curvature radius R12 of an image-side surface of the sixth lens, a curvature radius R13 of an object-side surface of the seventh lens and a curvature radius R14 of the image-side surface of the seventh lens satisfy: 3.0< (R12+R13)/R14<4.5.

9. The optical imaging system according to claim 1, wherein a spacing distance T34 of the third lens and the fourth lens on the optical axis and a spacing distance T56 of the fifth lens and the sixth lens on the optical axis satisfy: 1.0≤T34/T56≤2.5.

10. The optical imaging system according to claim 1, wherein a center thickness CT5 of the fifth lens on the optical axis and a spacing distance T45 between the fourth lens and the fifth lens on the optical axis satisfy: 3.0<CT5/T45<6.1.

11. The optical imaging system according to claim 1, wherein a combined focal length f34 of the third lens and the fourth lens and a combined focal length f12 of the first lens and the second lens satisfy: 1.0<f34/f12<2.0.

12. The optical imaging system according to claim 1, wherein SAG22 is an on-axis distance from an intersection point of an image-side surface of the second lens and the optical axis to an effective radius vertex of the image-side surface of the second lens, SAG21 is an on-axis distance from an intersection point of an object-side surface of the second lens and the optical axis to an effective radius vertex of the object-side surface of the second lens, and the SAG22 and the SAG21 satisfy: 0.5<SAG22/SAG21<1.5.

13. The optical imaging system according to claim 1, wherein an Abbe number V2 of the second lens and an Abbe number V3 of the third lens satisfy: V2+V3<40.

14. The optical imaging system according to claim 1, wherein an Abbe number V5 of the fifth lens satisfy: V5<40.

15. An optical imaging system, sequentially comprising, from an object side to an image side along an optical axis:
a diaphragm;
a first lens with a refractive power, an image-side surface thereof being a convex surface;
a second lens with a refractive power;
a third lens with a negative refractive power;
a fourth lens with a refractive power, an image-side surface thereof being a convex surface;
a fifth lens with a refractive power, an object-side surface thereof being a concave surface;
a sixth lens with a refractive power; and
a seventh lens with a refractive power,
wherein Semi-FOV is a half of a maximum field of view of the optical imaging system, and the Semi-FOV satisfies: 40°<Semi-FOV<45°; and
at least one of an object-side surface of the first lens to an image-side surface of the seventh lens is an aspheric surface;
TTL is a distance from the object-side surface of the first lens to an imaging surface of the optical imaging system on the optical axis, and the TTL and a center thickness CT4 of the fourth lens on the optical axis satisfy: 5.5<TTL/CT4<6.5.

16. The optical imaging system according to claim 15, wherein an effective focal length f1 of the first lens and an effective focal length f2 of the second lens satisfy: −3.0<f2/f1<−2.5.

17. The optical imaging system according to claim 15, wherein an effective focal length f3 of the third lens and an effective focal length f4 of the fourth lens satisfy: −3.0<f3/f4<−1.5.

18. The optical imaging system according to claim 15, wherein a spacing distance T67 of the sixth lens and the seventh lens on the optical axis and a spacing distance T23 of the second lens and the third lens on the optical axis satisfy: 1.0<T67/T23<1.5.

* * * * *